(12) United States Patent
Combs

(10) Patent No.: US 7,516,941 B2
(45) Date of Patent: Apr. 14, 2009

(54) VALVE WITH ACTUATION SUB-ASSEMBLY

(75) Inventor: Eric N Combs, Goshen, IN (US)

(73) Assignee: Elkhart Brass Manufacturing Company, Inc., Elkhart, IN (US)

( * ) Notice: Subject to any disclaimer, the term of this patent is extended or adjusted under 35 U.S.C. 154(b) by 142 days.

(21) Appl. No.: 11/247,791

(22) Filed: Oct. 11, 2005

(65) Prior Publication Data

US 2007/0080315 A1    Apr. 12, 2007

(51) Int. Cl.
*F16K 1/16* (2006.01)

(52) U.S. Cl. .............. 251/292; 251/248; 251/315.01

(58) Field of Classification Search .......... 251/248, 251/249.5, 250, 250.5, 315.01, 291, 292
See application file for complete search history.

(56) References Cited

U.S. PATENT DOCUMENTS

| | | | | |
|---|---|---|---|---|
| 3,064,938 A | * | 11/1962 | Granville | 251/171 |
| 3,776,507 A | * | 12/1973 | Tomlin et al. | 251/248 |
| 3,954,251 A | * | 5/1976 | Callahan et al. | 251/288 |
| 4,085,770 A | * | 4/1978 | Woronowicz | 137/238 |
| 4,218,042 A | * | 8/1980 | Eckel | 251/288 |
| 5,240,030 A | | 8/1993 | Wang | |
| 5,553,831 A | | 9/1996 | Ozaki et al. | |
| 6,073,907 A | | 6/2000 | Schreiner, Jr. et al. | |
| 6,206,023 B1 | * | 3/2001 | Landers | 137/15.18 |
| 6,227,223 B1 | | 5/2001 | Crochet et al. | |
| 6,540,206 B2 | * | 4/2003 | Guerra | 251/288 |
| 6,659,419 B2 | | 12/2003 | Chatufale | |
| 6,880,806 B2 | | 4/2005 | Haikawa et al. | |
| 6,883,614 B2 | | 4/2005 | Schmidt et al. | |
| 7,048,251 B2 | | 5/2006 | Schreiner | |

* cited by examiner

*Primary Examiner*—John K Fristoe, Jr.
(74) *Attorney, Agent, or Firm*—Van Dyke, Gardner, Linn & Burkhart, LLP

(57) ABSTRACT

A valve assembly includes a valve body, with an inlet, an outlet, and a chamber extending between the inlet and the outlet, an actuator, and an actuation sub-assembly. Positioned in the chamber is a valve ball with a ball body and a transverse passage extending through the ball body. The valve ball is positionable between a valve open position wherein said transverse passage provides fluid communication between the inlet and the outlet and a valve closed position wherein the ball body blocks the fluid communication between the inlet and the outlet. The actuation sub-assembly engages the actuator, which in turn engages the valve ball. In addition, the valve body includes a valve body wall with a planar portion. The planar portion includes a mounting surface for mounting the actuation sub-assembly to the valve body. When the actuation sub-assembly is mounted to the valve body, the actuator extends through the planar portion of the valve body wall for engagement with the engagement surface of the valve ball and for engagement with the actuator sub-assembly.

21 Claims, 18 Drawing Sheets

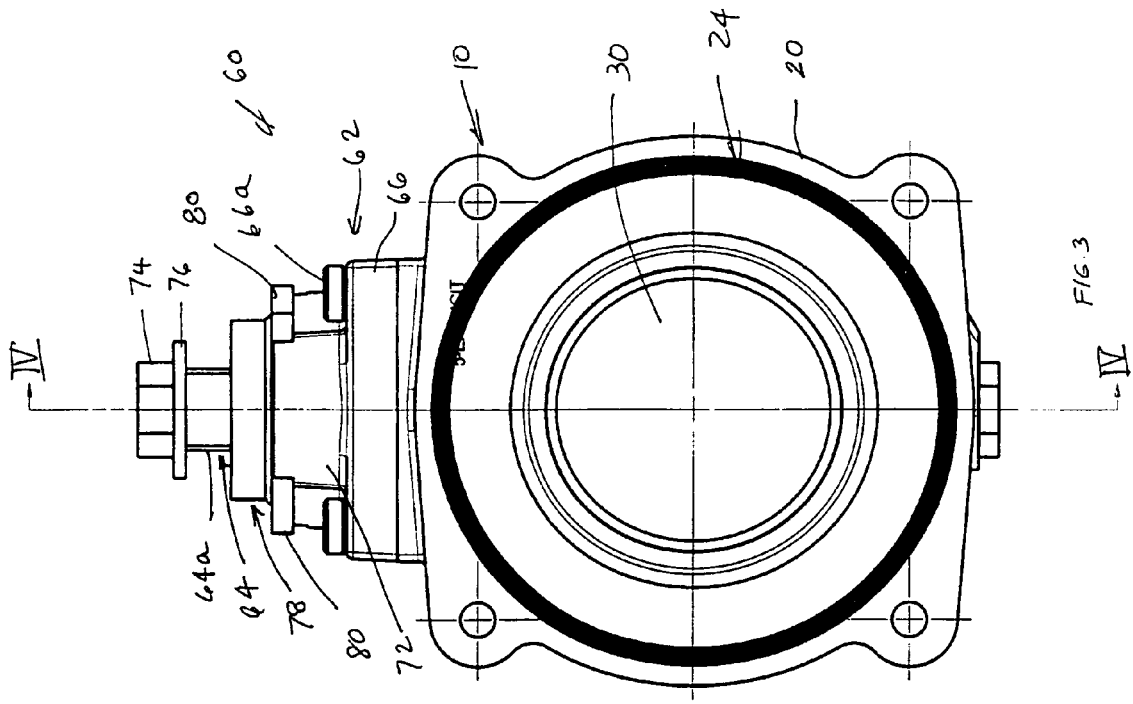
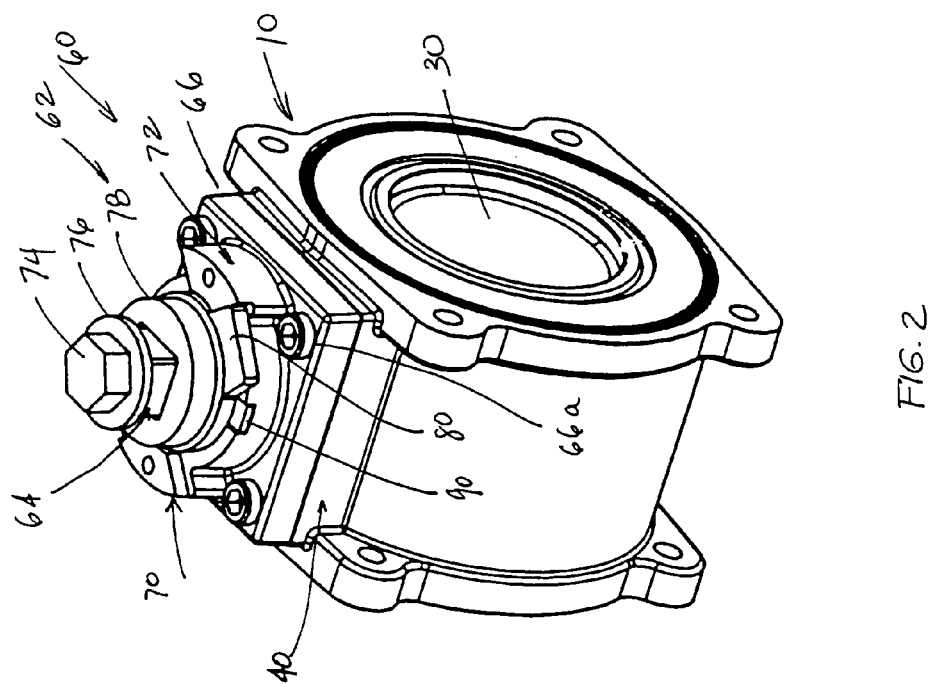
FIG. 2
FIG. 3

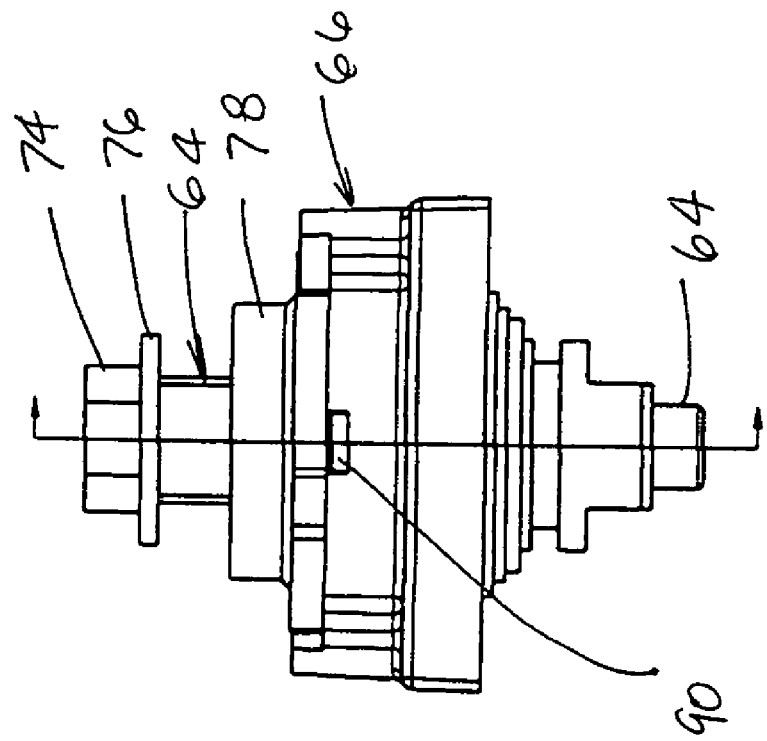
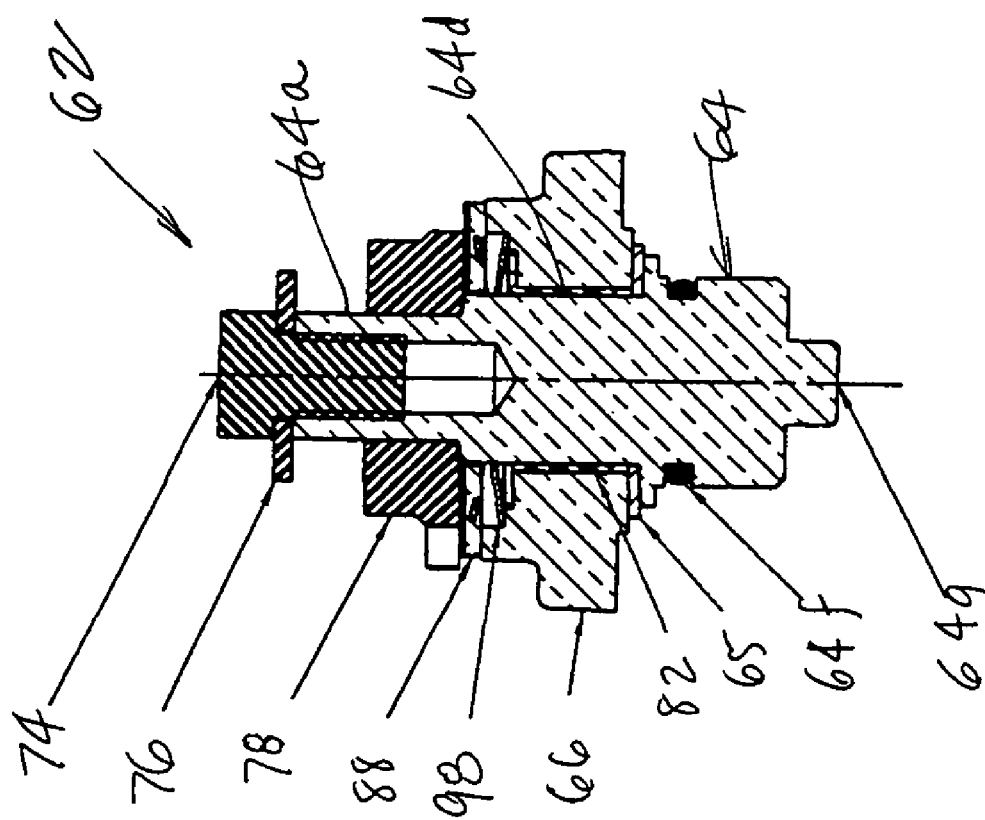

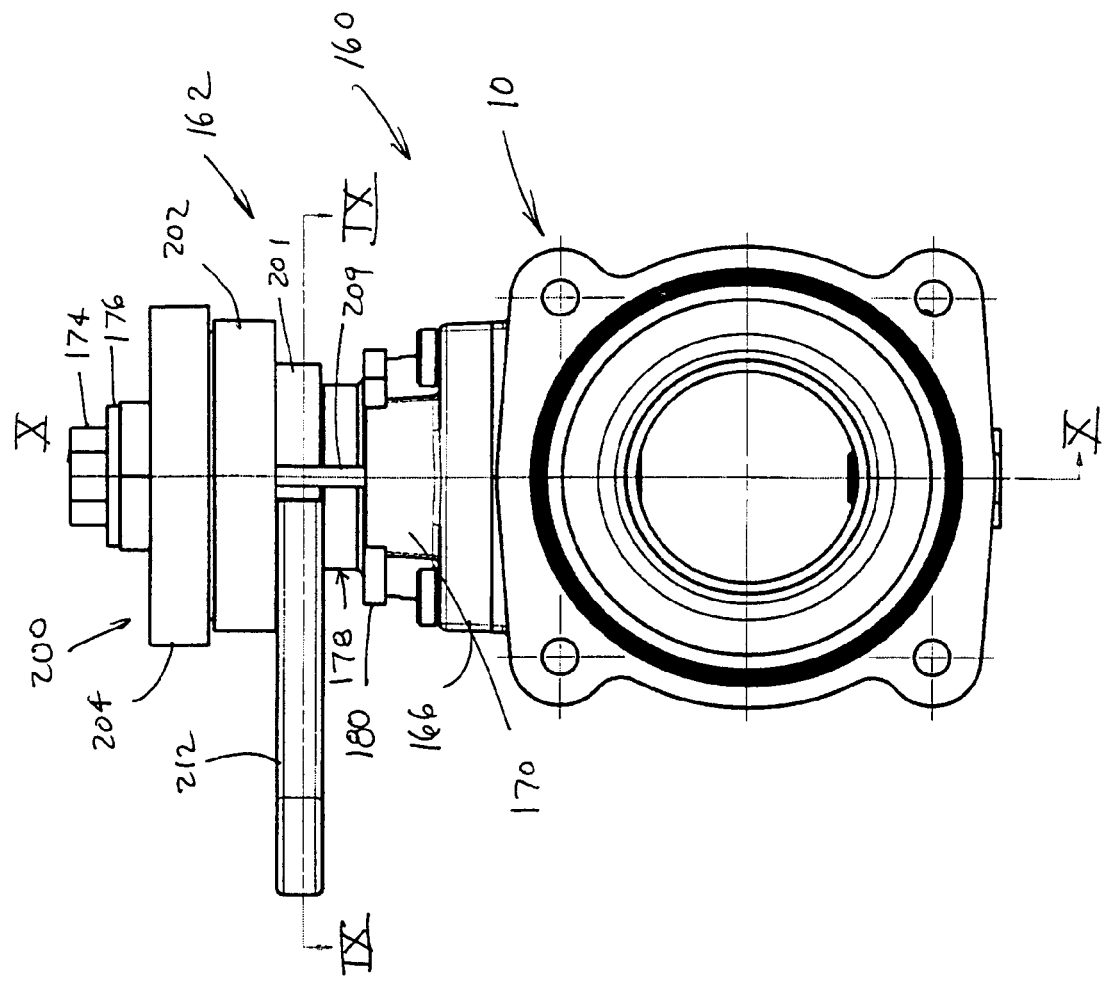
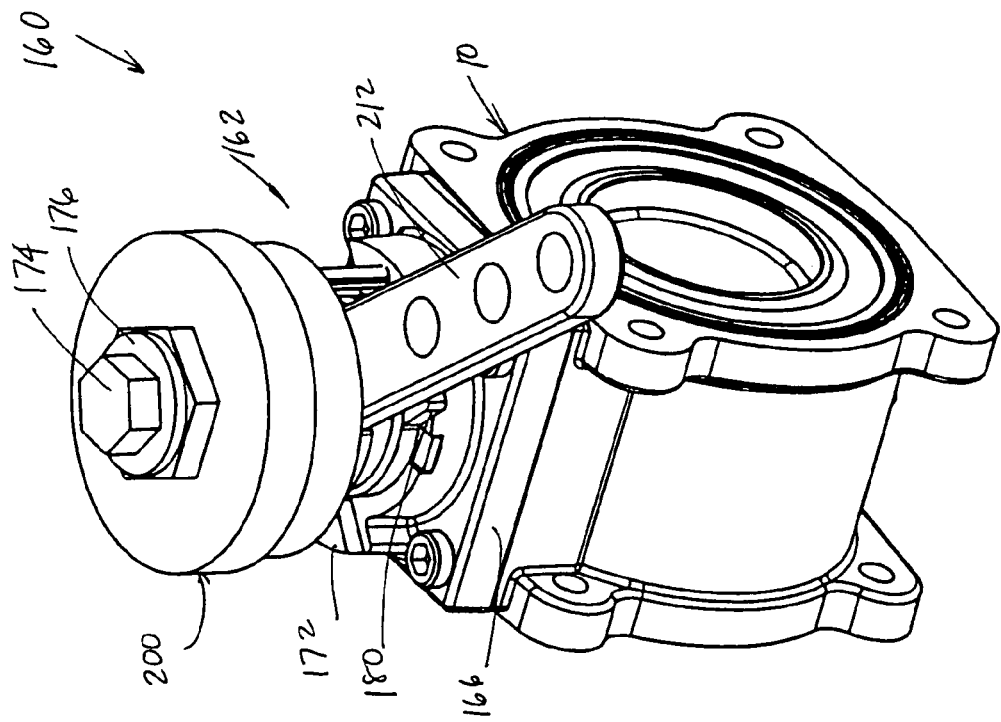

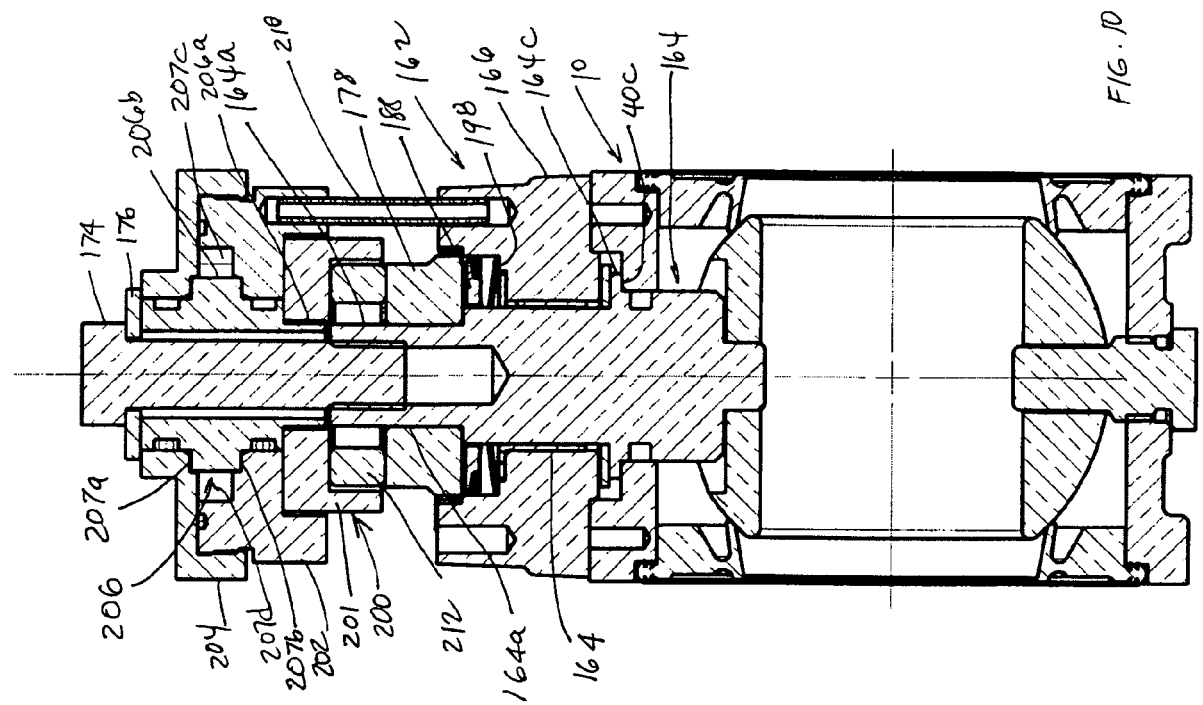
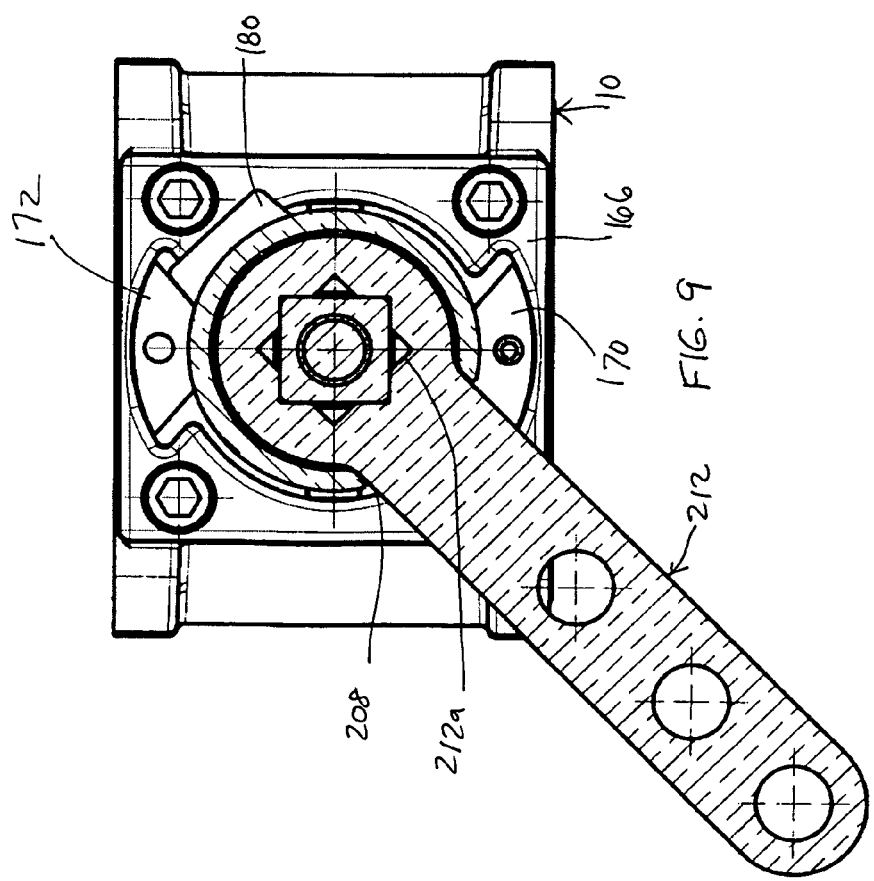
FIG. 10
FIG. 9

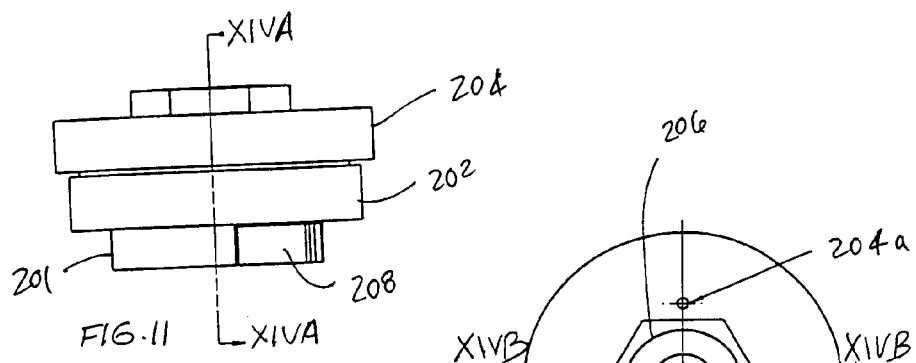
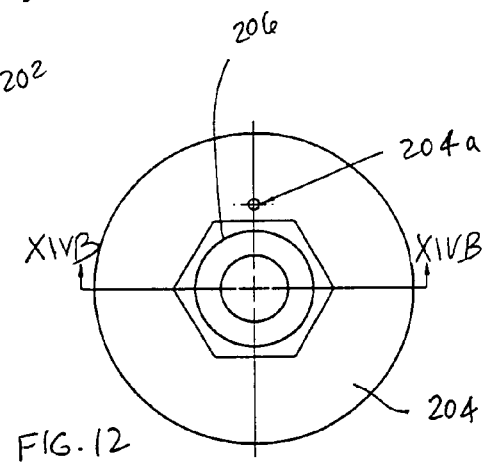
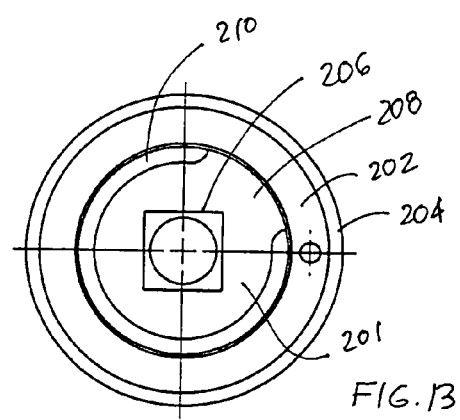
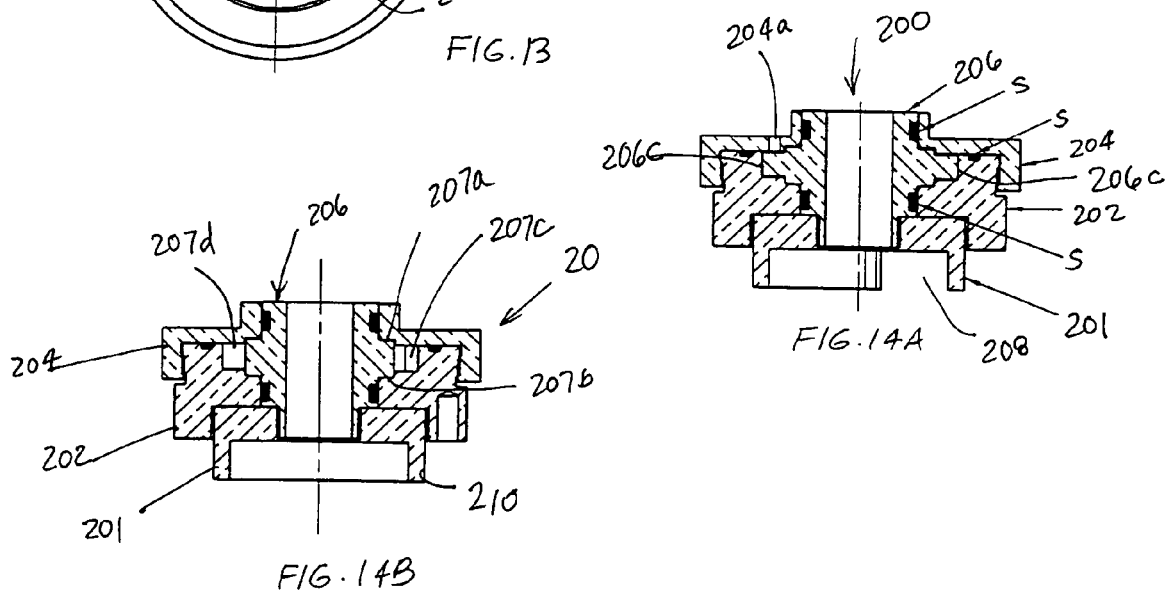

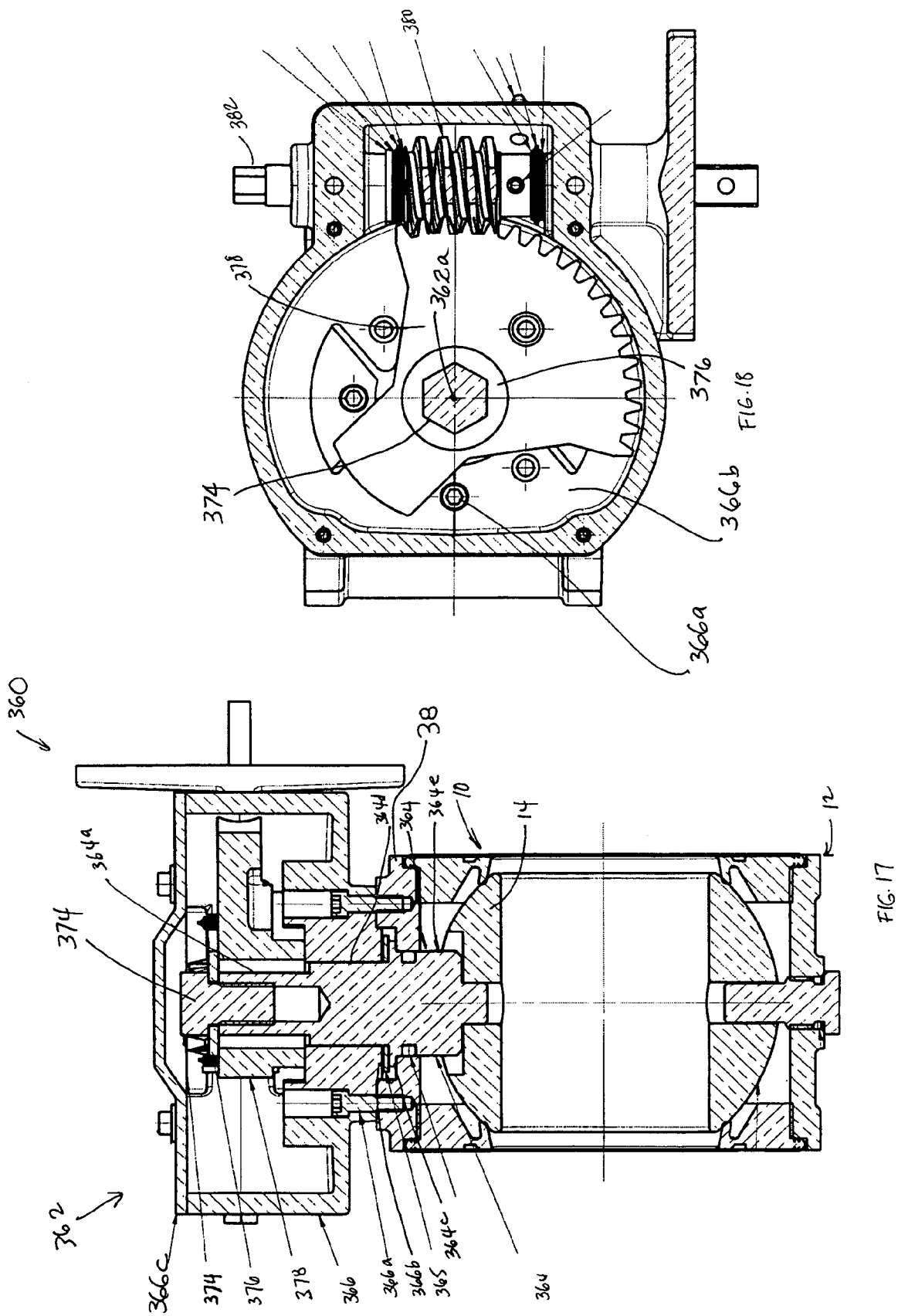

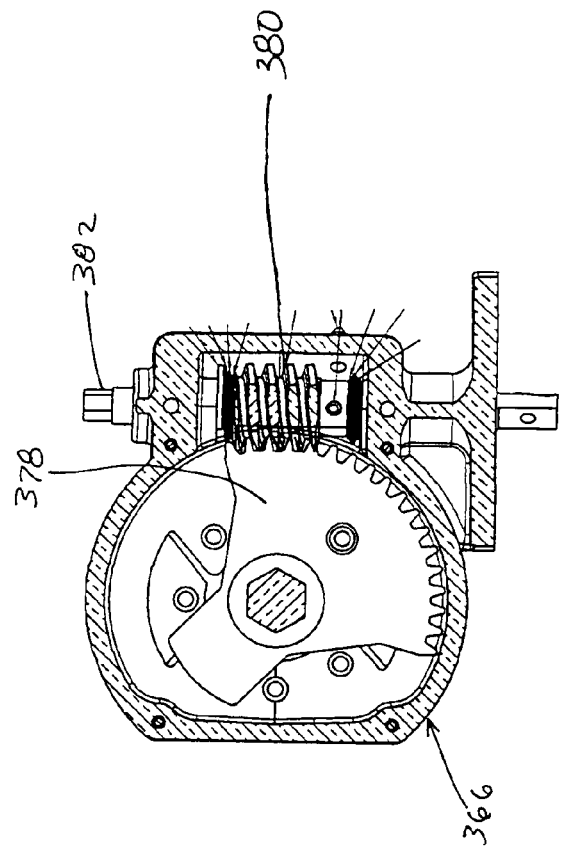
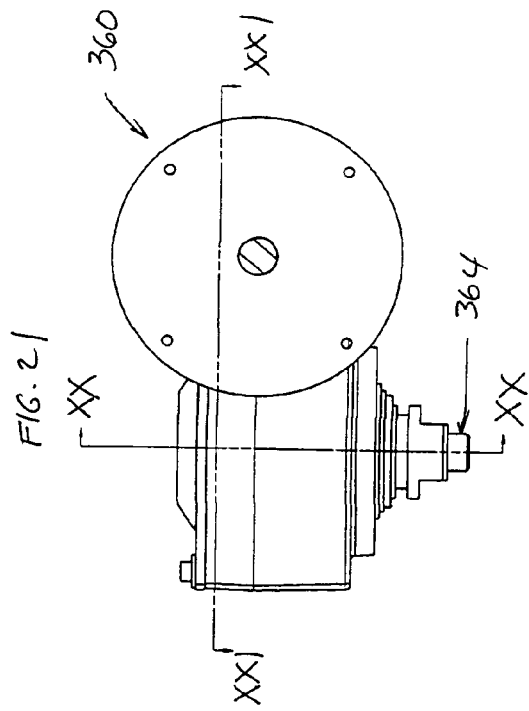
FIG. 21
FIG. 19
FIG. 20

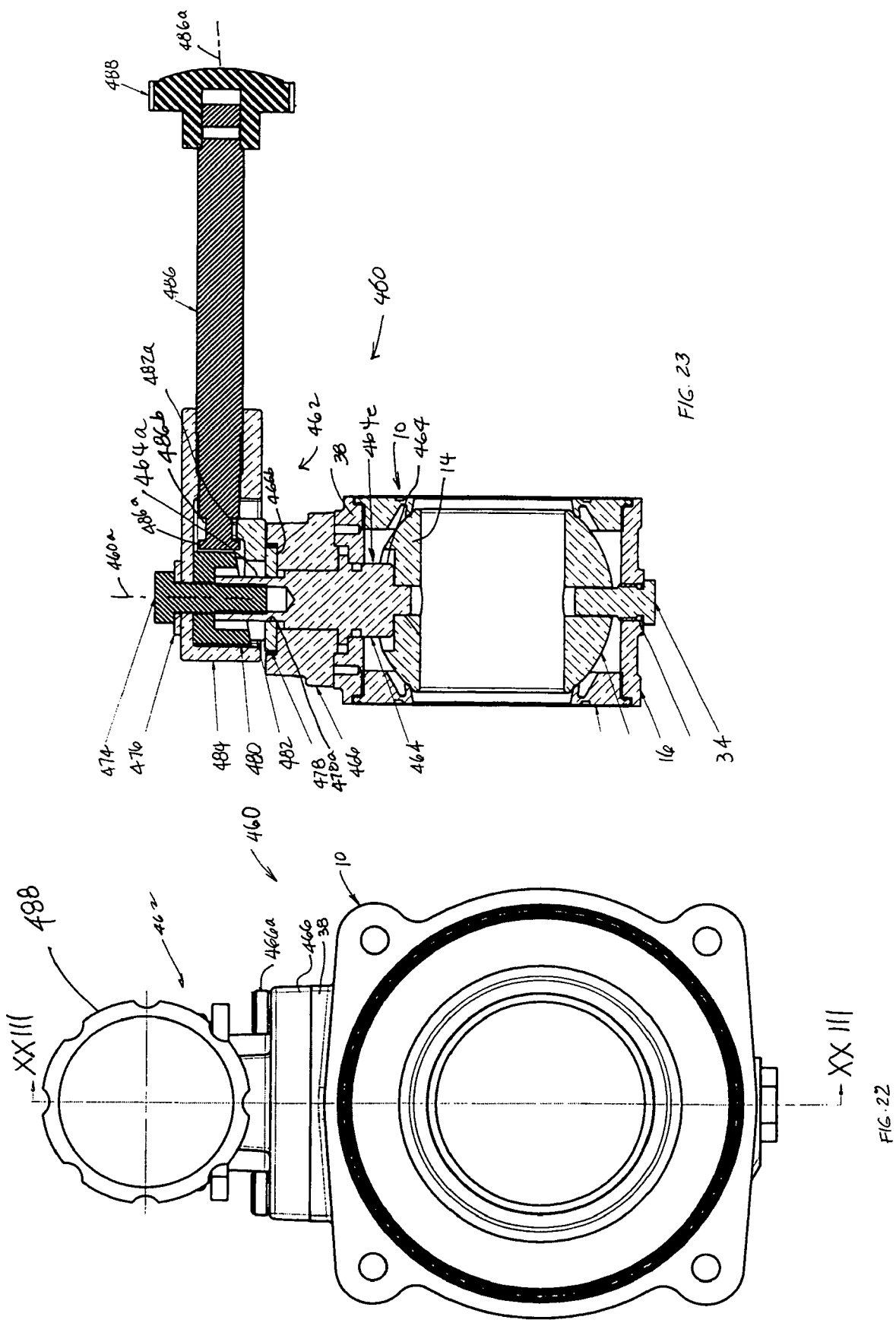

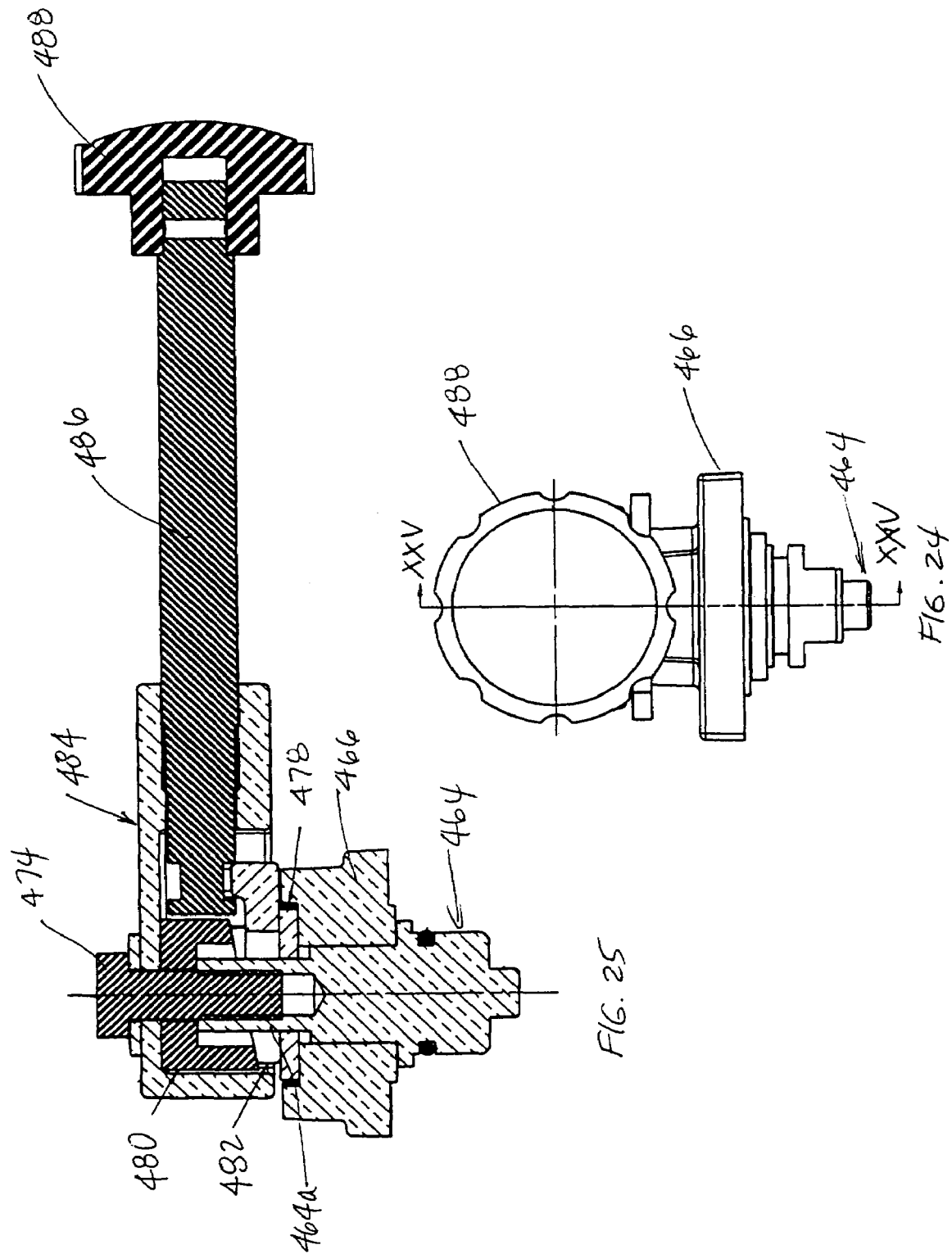

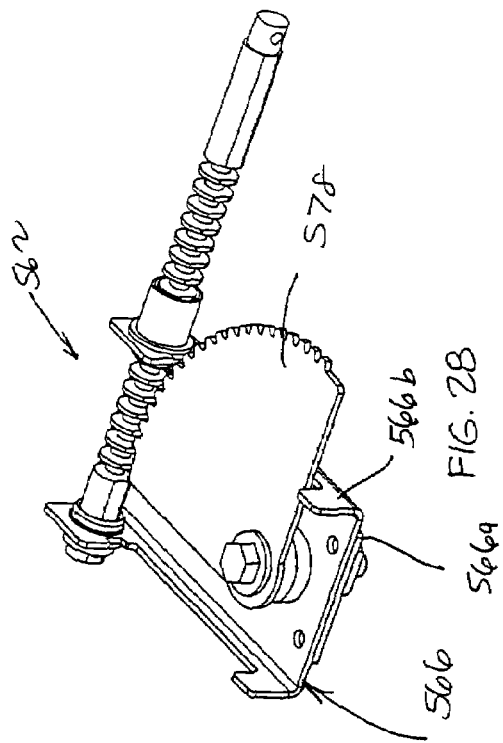
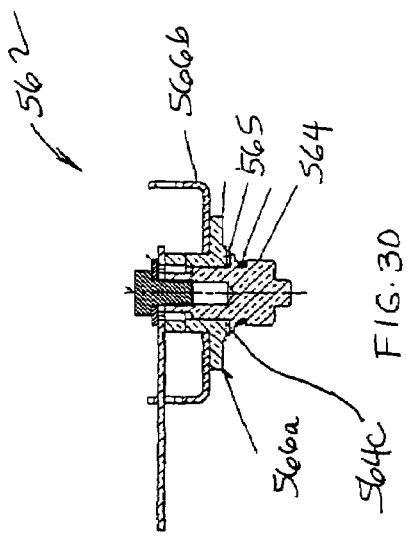
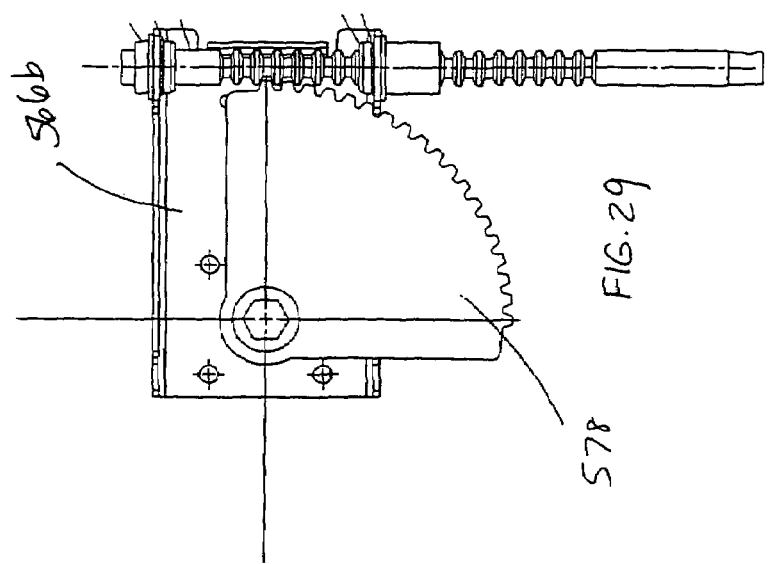

VALVE WITH ACTUATION SUB-ASSEMBLY

TECHNICAL FIELD AND BACKGROUND OF THE INVENTION

The present invention generally relates to a valve and, more particularly, to a ball valve for use in the fire fighting industry.

Valves, specifically ball valves, within the fire fighting industry have gone through relatively little change over the years except with regard to actuation method. Initially, valves were manually operated through push/pull rods attached to the valve handle in order to open and close the valve. However, over time, handwheel gear drive actuation, electric actuation, rack and sector actuation and slow close actuation have been developed to provide flexibility and expanded capability of the valve applications. Because the actuation device for each method is significantly different, revised valve bodies were developed to accommodate attachment of the different actuation devices to the valve. While a small portion of the exterior of the valve was changed, the basic water way of the valve was not altered. The result is a single valve requirement, 2.5" ball valve for instance, will have as many as four different body configurations to provide the user with the opportunity to select from the five different actuation methods.

Consequently, a valve manufacturer is required to have a large inventory of valves to accommodate the various different body configurations. Furthermore, a different mold is required for each valve, which increases the cost to produce the different style valves. In addition, once the valve is installed because the valve bodies are not interchangeable, the valve actuation methods cannot be changed after installation. Furthermore, repair parts for the respective valves tend to be more expensive due to the lack of commonality of the valve bodies.

Accordingly, there is a need for an improved valve that can accommodate different actuation devices without the need for different valve bodies.

SUMMARY OF THE INVENTION

According to the present invention, a valve body is provided that can be used in combination with any one of a plurality of actuation sub-assemblies that allow the user to fully open, fully close, or partially open the valve, including, for example, a mechanical actuation sub-assembly, a gear actuation sub-assembly, including an electric gear actuation sub-assembly or a handwheel gear actuation sub-assembly, a slow-close actuation assembly, a rack and sector actuation sub-assembly, or the like, or provide for only a fully open valve or fully closed valve, such as a pneumatic or hydraulic actuation sub-assembly.

Consequently, the present invention has reduced the inventory requirements of a valve manufacturer and, further, provides a valve that can be retrofit with another actuation sub-assembly even when installed.

In one form of the invention, a valve assembly includes a valve body, with an inlet, an outlet, and a chamber extending between the inlet and the outlet, a valve ball, an actuator, and an actuation sub-assembly. The valve ball includes a ball body and a transverse passage extending through the ball body. The valve ball is positioned in the chamber and is positionable between a valve open position wherein the transverse passage of the valve ball provides fluid communication between the inlet and the outlet and a valve closed position wherein the ball body blocks the fluid communication between the inlet and the outlet. The valve ball also includes an engagement surface for engagement by the actuator. In addition, the valve body includes a valve body wall with a planar portion. The planar portion includes a mounting surface for mounting the actuation sub-assembly to the valve body, with the actuator extending through the planar portion of the valve body wall for engagement with the engagement surface of the valve ball and for engagement by the actuation sub-assembly.

In one aspect, actuation sub-assembly comprises a manual actuation sub-assembly, a twist-lock actuation sub-assembly, a gear actuation sub-assembly, such as an electric gear actuation sub-assembly or a handwheel gear actuation sub-assembly, a rack and sector actuation sub-assembly, a slow close actuation sub-assembly, or a pneumatic or hydraulic actuation sub-assembly. Further, the actuation sub-assembly may include the actuator.

In other aspects, the valve body wall includes a cylindrical portion, the cylindrical portion having terminal edges terminating at opposed sides of the planar portion. In addition, the valve body further includes a pair of valve seats, with the cylindrical portion extending between the pair of valve seats and the planar portion extending between the valve seats and spanning between the terminal edges of the cylindrical portion.

According to another form of the invention, a valve body includes a valve body wall having a cylindrical portion and a planar portion and first and second valve seats, with the generally cylindrical portion extending between the first and second valve seats. A valve ball is positioned between the valve seats in the chamber formed by the valve body wall. The valve ball has a ball body and a transverse passage extending through the ball body and is positionable between a valve open position wherein the transverse passage provides fluid communication between the inlet and the outlet and a valve closed position wherein the ball body blocks fluid communication between the inlet and the outlet. In addition, the valve ball includes an engagement surface for engagement by an actuator. The planar portion of the valve body wall defines a mounting surface and has a transverse passageway extending therethrough for receiving the actuator cooperative with one of each of a manual actuation sub-assembly, a gear actuation sub-assembly, such as an electric gear actuation sub-assembly or a handwheel gear actuation sub-assembly, a twist-lock actuation sub-assembly, a rack and sector actuation sub-assembly, and a slow close actuation sub-assembly.

In one aspect, the planar portion extends between the first and second valve seats.

In other aspects, the valve body wall includes second and third planar portions interconnecting the first planar portion and the cylindrical portion. The second and third planar portions also extend and span between the valve seats.

Accordingly, the present invention provides a valve body that can be used in a number of valve configurations, including a mechanically actuated valve configuration, an electrically actuated valve configuration, a handwheel actuated valve configuration, a slow-close valve configuration, a rack and sector actuated valve configuration, or a pneumatically or hydraulically actuated configuration, or the like.

These and other objects, advantages, purposes, and features of the invention will become more apparent from the study of the following description taken in conjunction with the drawings.

DETAILED DESCRIPTION OF THE DRAWINGS

FIG. 2 is a perspective view of a valve body with a manual actuation sub-assembly;

FIG. 3 is an elevation view of the valve body and actuation sub-assembly of FIG. 2;

FIG. 5 is an elevation view of the manual actuation sub-assembly;

FIG. 6 is a cross-section view taken along line FIG. VI-VI of FIG. 5;

FIG. 7 is a perspective view of the valve body of the present invention with a slow-close actuation sub-assembly;

FIG. 8 is an elevation view of the valve assembly of FIG. 7;

FIG. 9 is cross-section view taken along line IX-IX of FIG. 8;

FIG. 10 is a cross-section view taken along line X-X of FIG. 8;

FIG. 11 is a side elevation view of the slow-close actuation device of the slow-close actuation assembly;

FIG. 12 is a top plan view of the slow-close device of FIG. 11;

FIG. 13 is a bottom plan view of the slow-close device of FIG. 11;

FIG. 14A is a cross-section view taken along line XIVA-XIVA of FIG. 11;

FIG. 14B is a cross-section view taken along line XIVB-XIVB of FIG. 12;

FIG. 17 is a cross-section view taken along XVII-XVII of FIG. 16;

FIG. 18 is a cross-section view taken along line XVIII-XVIII of FIG. 16;

FIG. 19 is a side view of the gear actuator sub-assembly;

FIG. 20 is a cross-section view taken along line XX-XX of FIG. 19;

FIG. 21 is a cross-section view taken along line XXI-XXI of FIG. 19;

FIG. 22 is a side elevation view of the valve body of the present invention incorporating a twist lock actuator sub-assembly;

FIG. 23 is a cross-section view taken along line XXIII-XXIII of FIG. 22;

FIG. 24 is a side elevation view of the twist lock actuator sub-assembly of FIG. 22;

FIG. 25 is a cross-section view taken along line XXV-XXV of FIG. 24;

FIG. 28 is a perspective view of the rack and sector actuator sub-assembly;

FIG. 29 is a top plan view of the rack and sector actuator sub-assembly of FIG. 27;

FIG. 30 is a cross-section view taken along line XXX-XXX of FIG. 27; and

DETAILED DESCRIPTION OF THE PREFERRED EMBODIMENTS

Figure 1:
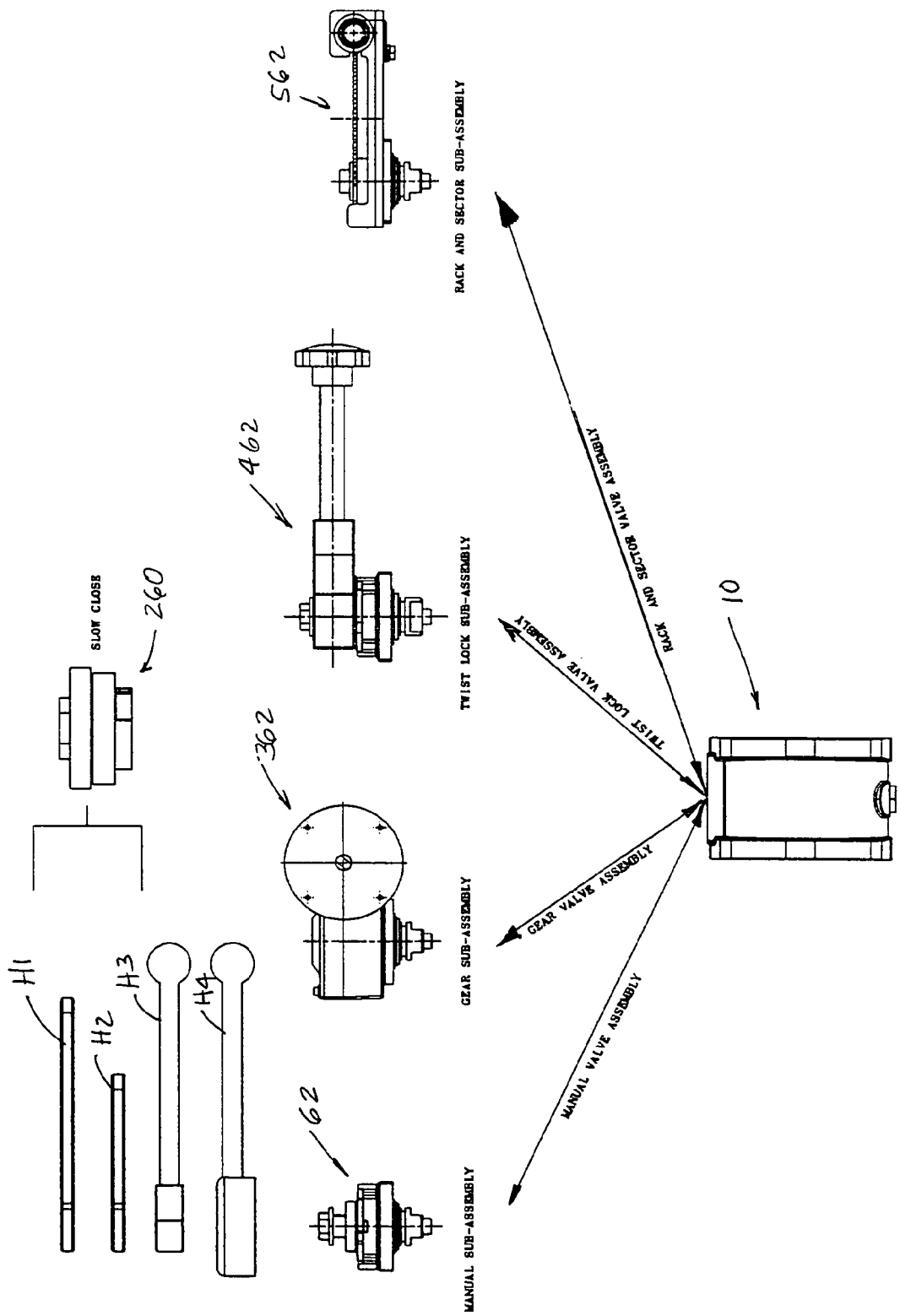
FIG. 1 is a schematic drawing of a valve body of the present invention with examples of different actuator sub-assemblies that may be mounted to the valve body.

Referring to FIG. 1, the numeral 10 generally designates a valve body of the present invention. As will be more fully described below, valve body 10 is configured to receive one of several actuation sub-assemblies for opening and closing the valve. For example, valve body 10 is configured to receive an actuator of a manual actuation sub-assembly, a gear actuation sub-assembly (which can be either electrically driven or driven by a handwheel), a twist lock actuation sub-assembly, a rack and sector actuation sub-assembly, or a slow-close actuation sub-assembly. Alternately, valve body 10 may incorporate the actuator, with the actuation sub-assemblies adapted to cooperate with the actuator and the valve body. Though for ease of description, the actuation sub-assemblies described herein incorporate the actuator. Further, though illustrated and described in reference to a ball valve, it should be understood that the concepts of the present invention may be used with other types of valves, such as gate valves or butterfly valves or the like.

Figure 1A:
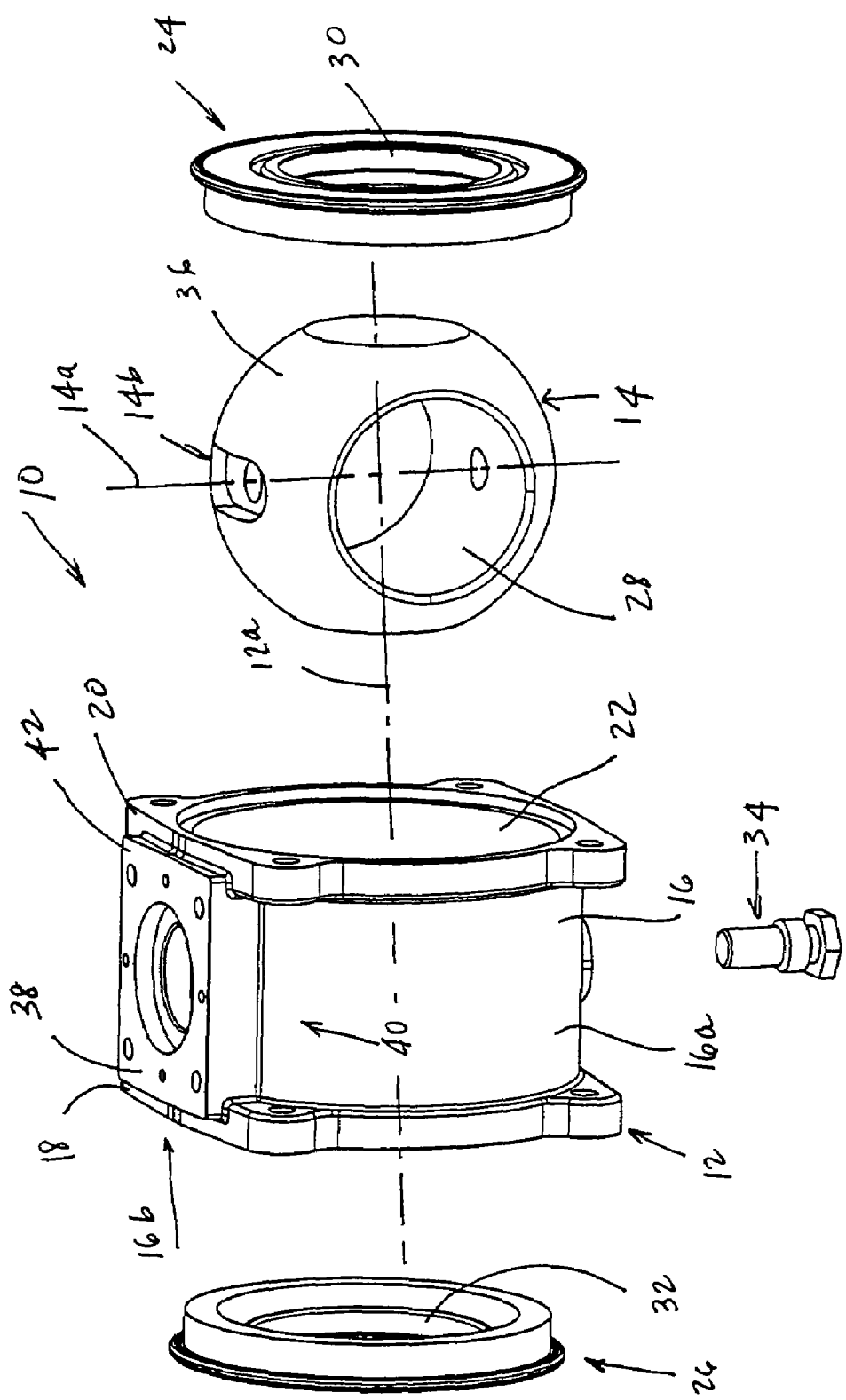
FIG. 1A is an exploded perspective view of the valve body of FIG. 1.

Referring to FIG. 1A, valve body 10 includes a housing 12 and a valve ball 14. Housing 12 includes a housing wall 16 and a pair of mounting flanges 18 and 20 for mounting the valve body between a respective pair of flanges in a piping system, for example. Valve ball 14 is located in passageway 22 of housing 12 and, further, captured therein by a pair of valve seats 24 and 26, which form a pair of opposed valve seat sealing surfaces 24a, 26a (FIG. 4) for valve body 10. As would be understood by those skilled in the art, valve ball 14 includes a transverse passageway 28, which when aligned along the longitudinal axis 12a of housing 12 is in fluid communication with the inlet 30 and outlet 32 of valve seats 24 and 26. To close the valve, valve ball 14 is pivoted or swiveled about its vertical axis 14a on a pivot bolt 34 by an actuator, which will be more fully described below, so that its valve ball wall 36 is seated in the valve seats 24 and 26 to thereby close the fluid communication between the inlet and outlet of the valve.

Referring again to FIG. 1A, as noted above, housing 12 includes a housing wall 16. To accommodate the various actuators, housing wall 16 includes a generally cylindrical portion 16a and a generally planar portion 16b, which is offset from the circumference of cylindrical portion 16a by an offset portion 40 and forms an adapter plate 38. Offset portion 40 is generally planar and perpendicular to planar portion 16b and, further, like planar portion 16b, extends between flanges 18 and 20. Plate 38 provides a generally planar 42 mounting surface for the respective actuation assemblies described herein and includes a transverse opening 44 through which the actuator of the respective actuation assembly extends for engagement with valve ball 14.

In each of the respective actuation assemblies described herein, the actuators that engage the valve ball are substantially identical so that each of the various actuation assemblies may be substituted for another actuation assembly even after the valve has been installed. Further, a single valve body may be used as a manually actuated valve, a twist lock actuated valve, a gear drive actuated valve, a rack and sector actuated valve, and a slow-close actuated valve. This modular aspect provides several advantages. For example, common tooling may be used in the manufacturing of the valve bodies and, further, in some of the actuator assembly parts. As would be understood, common tooling reduces the amount of inventories that are needed to provide the full range of valve types.

Figure 4:
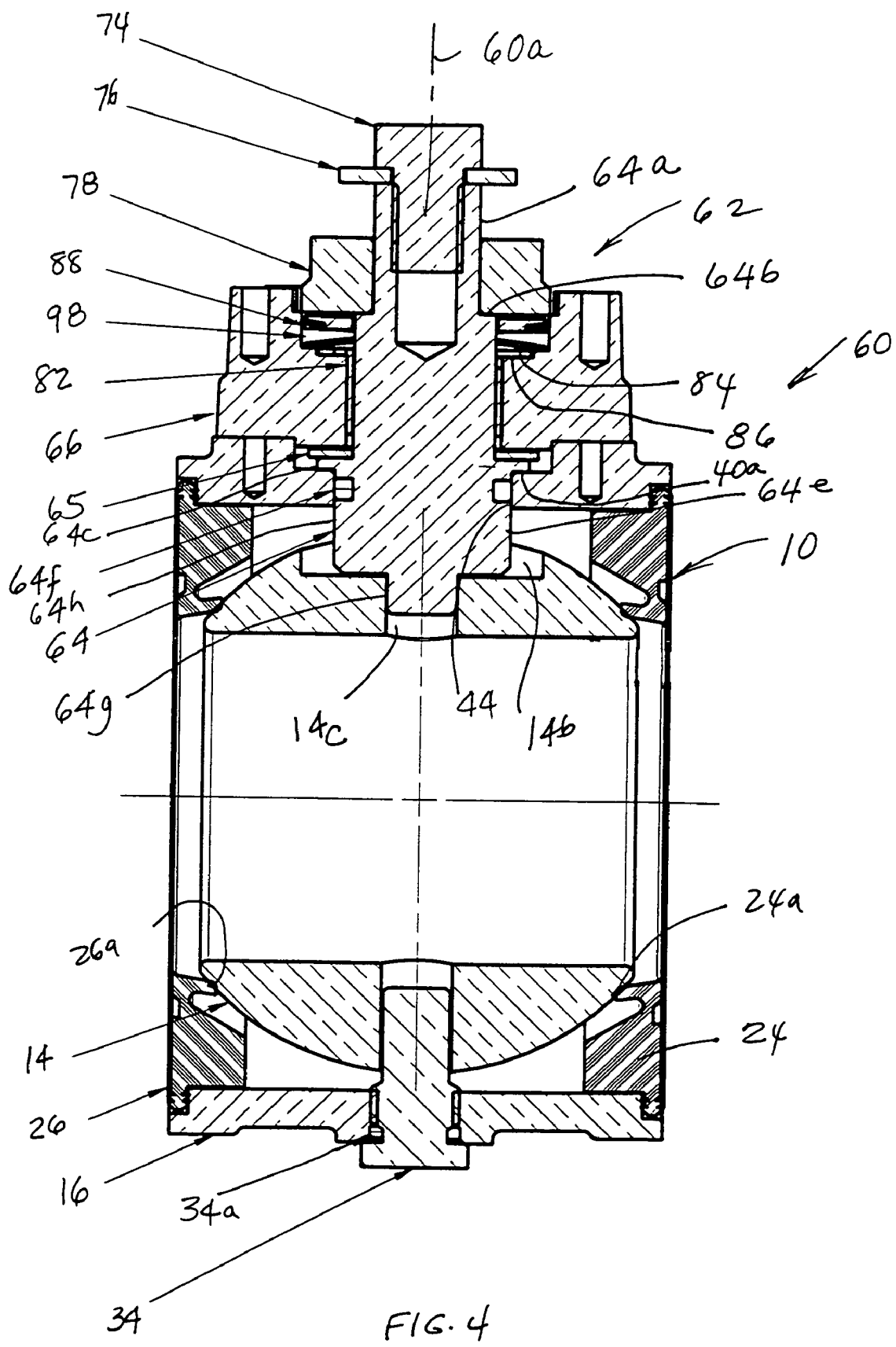
FIG. 4 is a cross-section view taken along line IV-IV of FIG. 3.

Referring to FIG. 2, the numeral 60 generally designates a manually actuated valve assembly of the present invention. Valve assembly 60 includes valve body 10 and a manual actuation sub-assembly 62. Manual actuation sub-assembly 62, as previously noted, includes an actuator 64 for opening and closing the valve and an adapter 66, which is configured to mount sub-assembly 62 to valve body 10 on plate 38 at mounting surface 42. As best seen in FIG. 4, actuator 64 extends through adapter 66 for engagement with the engagement surface of the valve ball to pivot the ball valve about pivot bolt 34 to thereby open or close the valve. Adapter 66 includes an upwardly extending collar 68 with a pair of stops 70 and 72, which provide the open and close valve positions for the actuator, described more fully below.

Referring to FIGS. 4-6 and 5A, upper portion 64a of actuator 64 includes a handle H1, H2, H3, H4 shown in FIG. 1, which is rotatably coupled to actuator 64 and mounted thereto a bolt 74 which is threaded into upper end 64a of actuator 64 and, further, mounted thereon over a washer 76 to thereby lock the handle to the actuator. Similar to stop plate 78 described below, the handle has a non-circular opening for mounting the handle on the non-circular portion (64a) of actuator 64. Thus, rotation of the handle about axis 60a induces rotation of actuator 64. Also mounted to upper end 64a of actuator 64 is a stop plate 78. Stop plate 78 is rotatably coupled to actuator 64 by virtue of the non-circular cross-section of actuator 64 at its upper end 64a and the non-circular opening 78a provided in stop plate 78 that mounts stop plate 78 about upper end 64a of actuator 64. Stop plate 78 rests on a shoulder 64b of actuator 64 and, as noted, is rotatably coupled to actuator 64 such that rotation of the handle about vertical axis 60a causes stop plate 78 to rotate about axis 60a along with actuator 64. Stop plate 78 includes an outwardly projecting tab 80 for engagement with stops 70 and 72 of adapter 66, which limit the rotation of actuator 64 between a first position where tab 80 engages stop 70 and a second position in which tab 80 engages stop 72, which represent the opened and closed positions of the valve.

Actuator 64 further includes a flange 64c at a lower end of its medial portion 64d, which has a larger diameter than the opening 44 of adapter plate 38, which acts as a stop to limit downward movement of actuator 64 into the valve body and valve ball 14. In addition, mounted over flange 64c is a washer 65 so that when adapter 66 is mounted to adapter plate 38 with fasteners 66a (FIG. 2), flange 64c is captured between adapter 66 and adapter plate 38 to thereby fix the vertical position of adapter 64 with respect to valve ball 14. To seal actuator 64 in housing 12, actuator 64 includes mounted about its lower portion 64e a seal 64f, such as an o-ring seal.

Figure 5A:
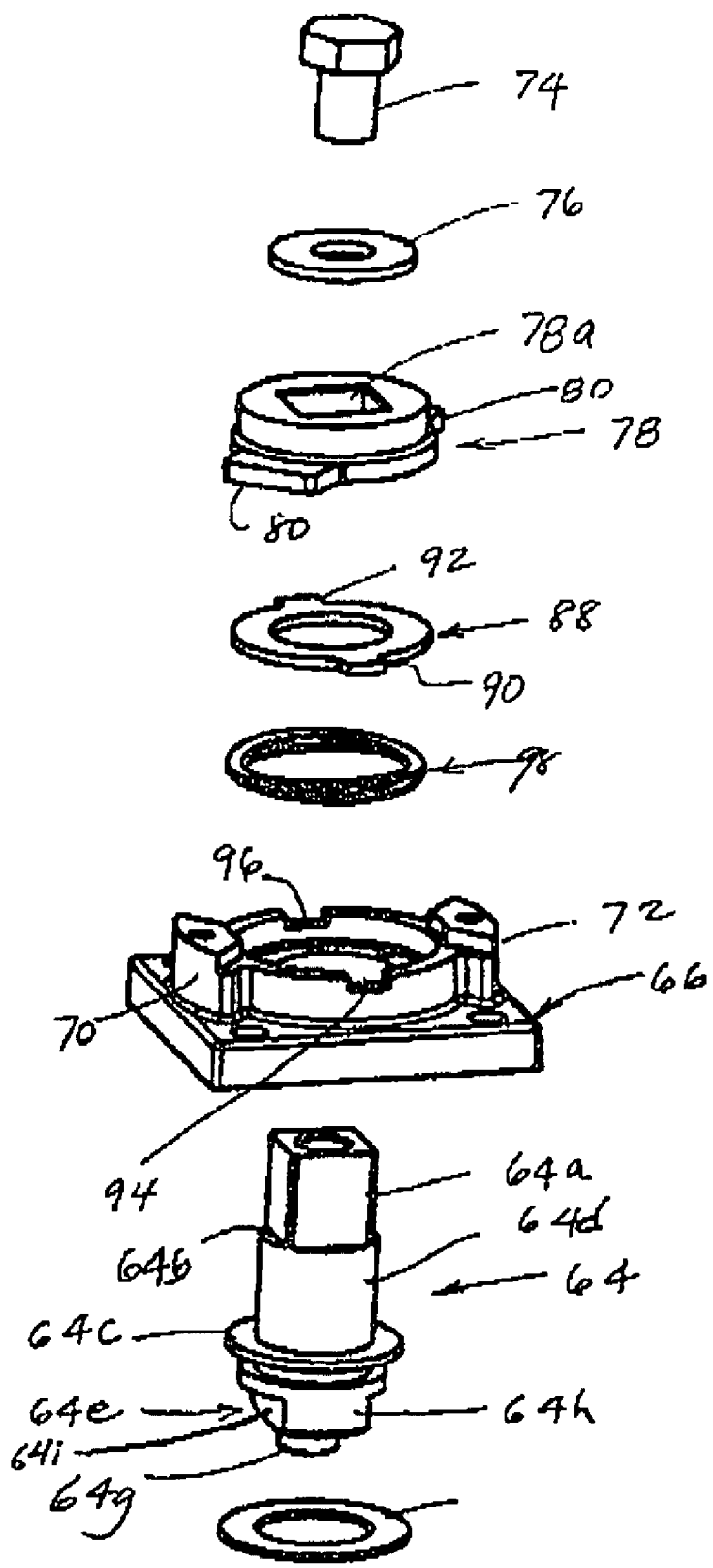
FIG. 5A is an exploded perspective view of the sub-assembly of FIG. 5.

To reduce friction, positioned between adapter 66 and the intermediate portion 64d of actuator 64 is a bushing 82 with an annular lip 84, which rests on shoulder 86 of adapter 66. In addition, to assure rotation occurs between the stop plate and adapter 66, a bearing brake 88 is mounted about the upper end of intermediate portion 64d, which provides a stationery bearing surface for the stop plate. Referring to FIG. 5A, bearing brake 88 comprises an annular member with a pair of tabs 90 and 92 that are located in recesses 94 and 96 of collar 68 of adapter 66 to rotationally lock brake 88 with respect to adapter 66. Positioned between bearing brake 88 and adapter 66 is a spring 98. In the illustrated embodiment, spring 98 comprises a wave washer, which urges brake 88 upward toward the underside of stop plate 78 to maintain friction between stop plate 78 and brake 88 and as a result creates a tight connection between the various parts.

As best seen in FIGS. 4, 5A, and 6, lower end 64e of actuator 64 includes a cylindrical pin 64g and an enlarged generally cylindrical body 64h. Referring to FIG. 4, cylindrical pin 64g and body 64h extend into a slotted recess 14b in wall of valve ball 14. As best seen in FIG. 4, slotted recess 14b includes a central opening 14c into which pin 64g extends and further aligns with pivot bolt 34. Body 64h is sized and shaped such that body 64h can be inserted into recess 14b and includes a pair of opposed generally planar engagement surfaces 64i, which are generally parallel and, further, are spaced apart approximately the width of recess 14b. In this manner, when actuator 64 is rotated about axis 60a, surfaces 64i of actuator 64 will bear against the sides of recess 14b and rotate valve ball 14 about vertical axis 14a about pin 64g and bolt 34 to thereby move the valve ball between its opened and closed positions to thereby open or close the valve.

Referring to FIG. 7, the numeral 160 refers to a slow-close actuated valve assembly. Slow-close actuated valve assembly 160 is of similar construction to manually actuated valve assembly 60 and includes valve body 10 and a slow-close actuation sub-assembly 162. Slow close actuation sub-assembly 162 is of similar construction to manual actuation sub-assembly 62 but includes additional components to provide a "slow-closed" function for the valve assembly.

As best seen in FIGS. 9 and 10, sub-assembly 162 includes an actuator 164, an adapter 166, and a stop plate 178, similar to the previous embodiment. Further, actuator 164 includes an enlarged flange 164c, which is captured between adapter 166 and adapter plate 38 of valve body 10. In the slow-close actuation assembly, mounted to upper end 164a of actuator 164 is a slow-close device 200, which includes a plurality of nested annular members 201, 202, and 204, which are mounted to upper end 164a of coupler 164 on a shaft 206 by an elongated bolt 174 and washer 176. Shaft 206 is generally cylindrical in shape and includes a non-circular cross-section at its lower end 206a that inserts into a non-circular opening in member 201 to thereby rotatably couple member 201 and shaft 206. Further shaft 206b includes an annular flange 206b that extends between annular members 202 and 204 and is sized to form annular spaces 207a and 207b between flange 206b and member 202 and between flange 206b and member 204. These spaces form orifices for a hydraulic fluid, more fully described below. In addition, flange 206b includes two extended flange portions 206c (FIG. 14) which have terminal ends to form a pair of chambers 207c, 207d, which are in fluid communication with each other through orifices 207a, 207b. Further, member 204 includes a fill opening 204a (FIG. 12) that is in fluid communication with one of the chambers and which allows hydraulic fluid to be introduced into the chambers. After filling, fill opening 204a is then closed by a set screw. In addition, seals S are provided between each of the members 201, 202, and 204 and the shaft to seal the chambers. Consequently, when shaft 206 is rotated in member 202, the hydraulic fluid creates a resistance to provide the slow-close function, as will be further explained below.

To actuate the slow-close device, slow-close device 200 includes a handle 212. Annular member 201 includes a slotted opening 208 in its downwardly depending annular wall 210 to receive handle 212. Handle 212 includes a non-circular transverse opening 212a for mounting handle 212 about upper portion 164a of actuator 164, which similarly has a non-circular cross-section to thereby rotatably couple handle 212, and in turn annular member 201, to actuator 164. In addition, when handle 212 is rotated, shaft 206, which is rotatably coupled to member 201 also will rotate. In contrast, annular member 202 is fixed relative to adapter 166 by a pin 209, which extends between respective bores provided in adapter 166 and annular member 202. As would be understood by those skilled in the art, when handle 212 is rotated, actuator 164 will pivot valve ball 14 about pivot bolt 34 and actuator 164, with the rotation of handle 212 being resisted by the hydraulic fluid as it passes between the two chambers of the slow-close device through the respective orifices. Again, tabs 180 of the stop plate 178 will limit the angular rotation of actuator 164 between the two stops (170 and 172) on adapter 166 which correspond to the open and closed positions of the valve.

In this manner, slow close device 200 is an add-on feature that can be mounted on a manual actuation assembly to control the opening and closing of the valve.

Figure 16:
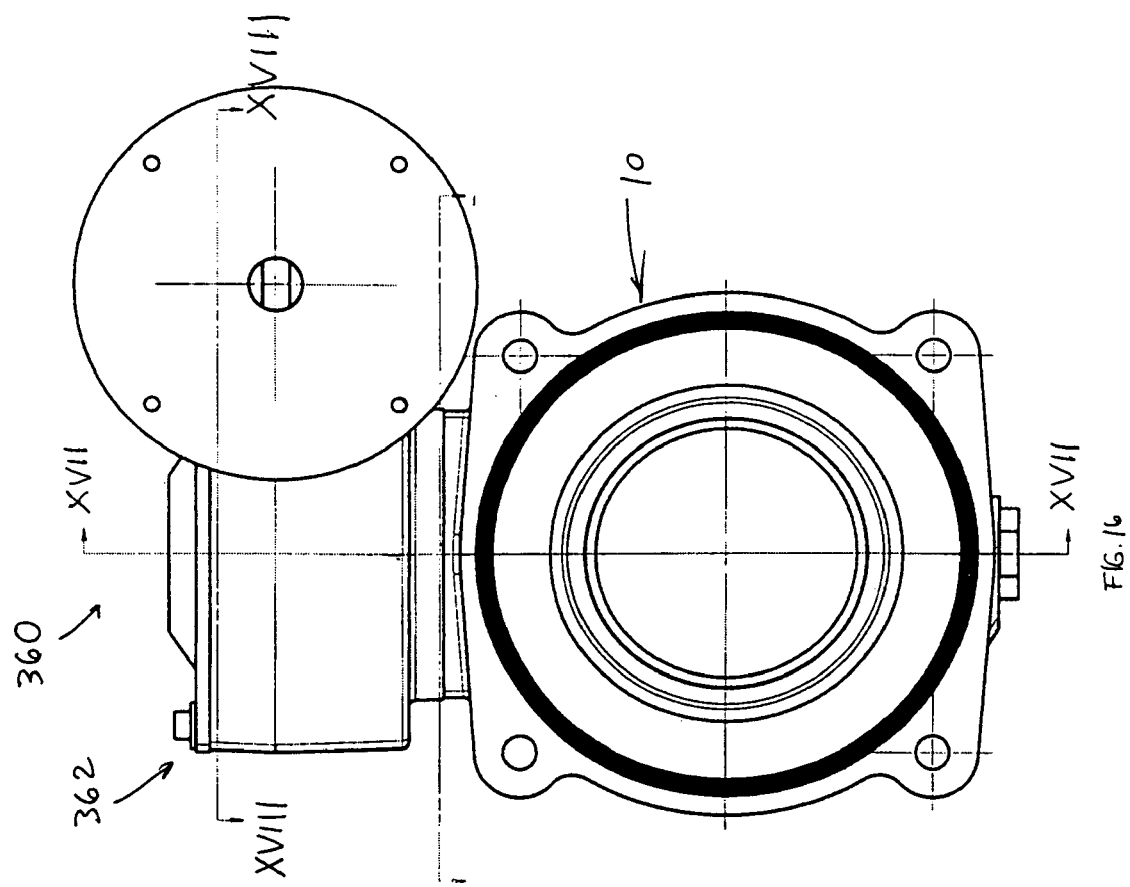
FIG. 16 is an elevation view of the valve assembly of FIG. 15.
Figure 15:
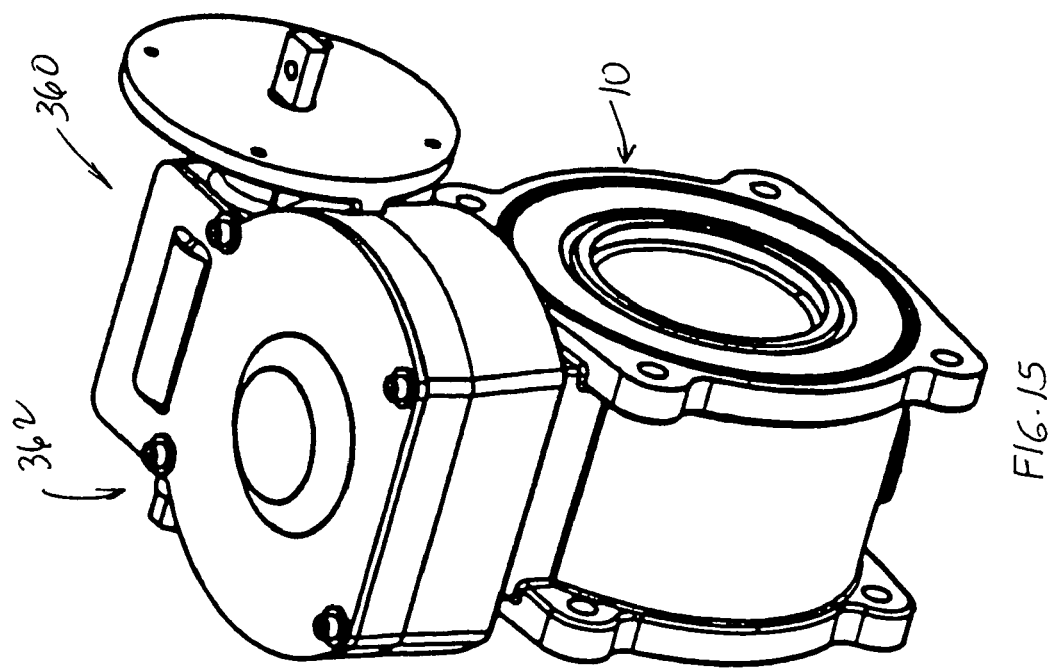
FIG. 15 is a perspective view of the valve body of the present invention with a gear actuator sub-assembly.

Referring to FIGS. 15-17, the numeral 360 generally refers to a gear actuated valve assembly. Gear actuated valve assembly 160 includes valve body 10 and a gear actuation sub-assembly 362. Gear actuation sub-assembly 362 similarly mounts to adapter plate 38 at mounting surface 42 of valve body 10 and includes an actuator 364 and a housing 366, which is adapted to mount sub-assembly 362 to valve body 10 on plate 38 at mounting surface 42. Actuator 364 is of similar construction to actuators 64 and 164 and includes an upper portion 364a, an intermediate portion 364d, and a lower portion 364e, which engages and pivots valve ball 14 in a similar manner described in reference to the first embodiment.

Referring to FIG. 17, housing 366 is mounted to adapter plate 38 of valve body 10 by a plurality of fasteners 366a that extend through lower or base wall 366b of housing 366. In a similar manner to actuators 64 and 164, actuator 364 includes a washer 365 which is mounted about intermediate portion 364d of actuator 364 and which rests on enlarged flange 364c of actuator 364 wherein flange 364c is captured between adapter plate 38 and lower wall 366b of housing 366 when housing 366 is mounted to plate 38.

Figure 19A:
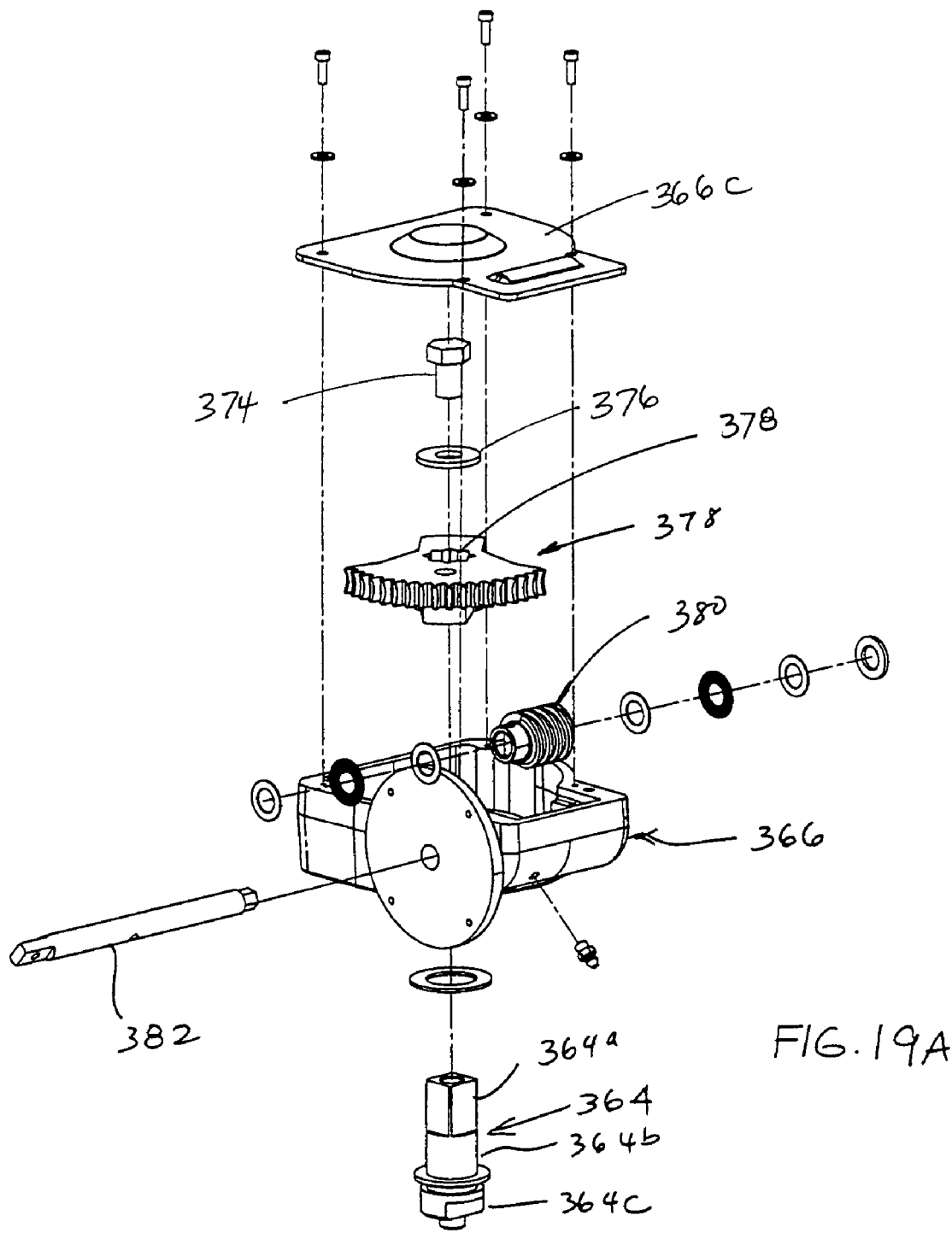
FIG. 19A is an exploded perspective view of the gear actuator sub-assembly of FIG. 19.
Figure 26:
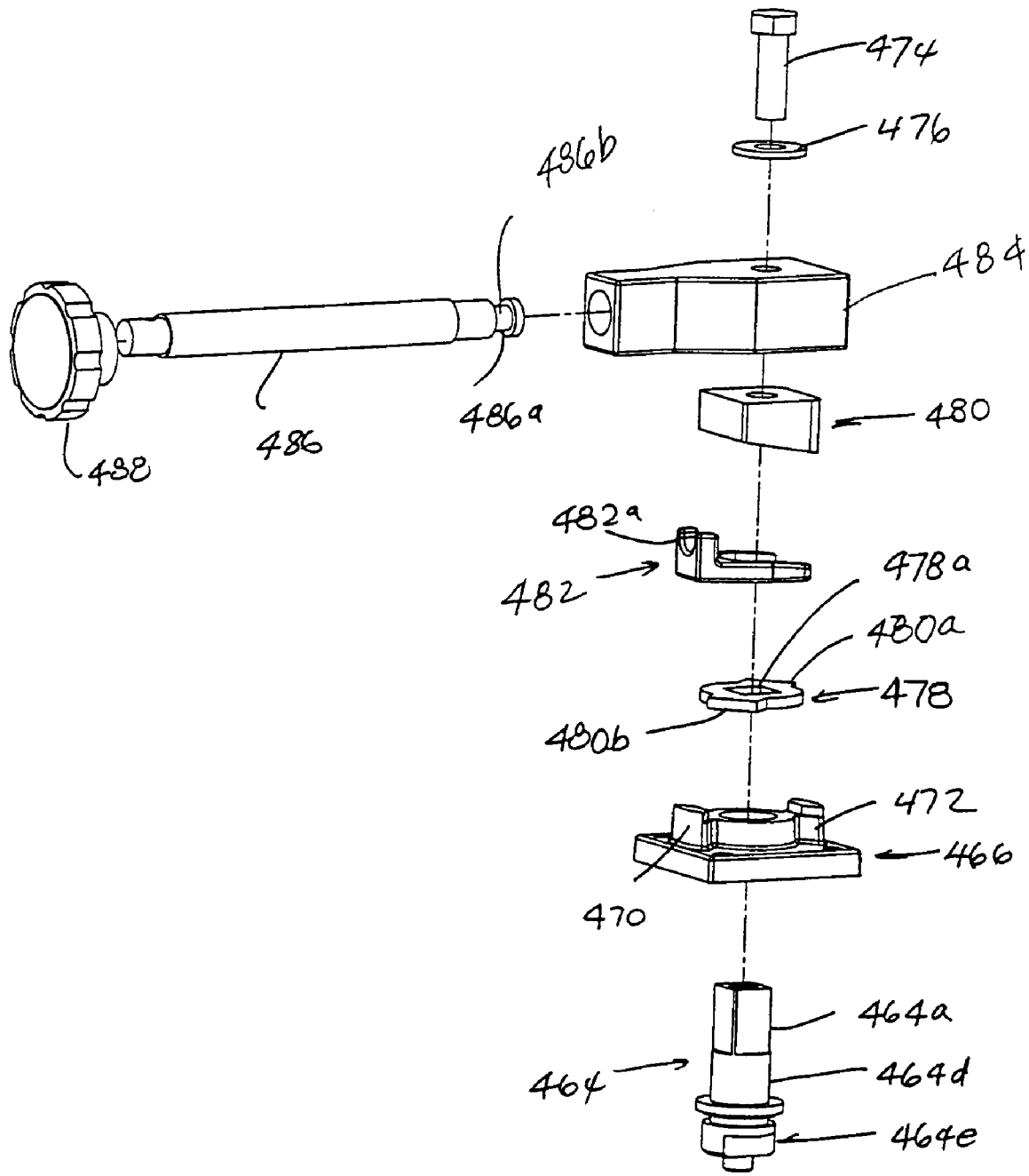
FIG. 26 is an exploded perspective view of the twist lock actuator of FIG. 24.
Figure 31:
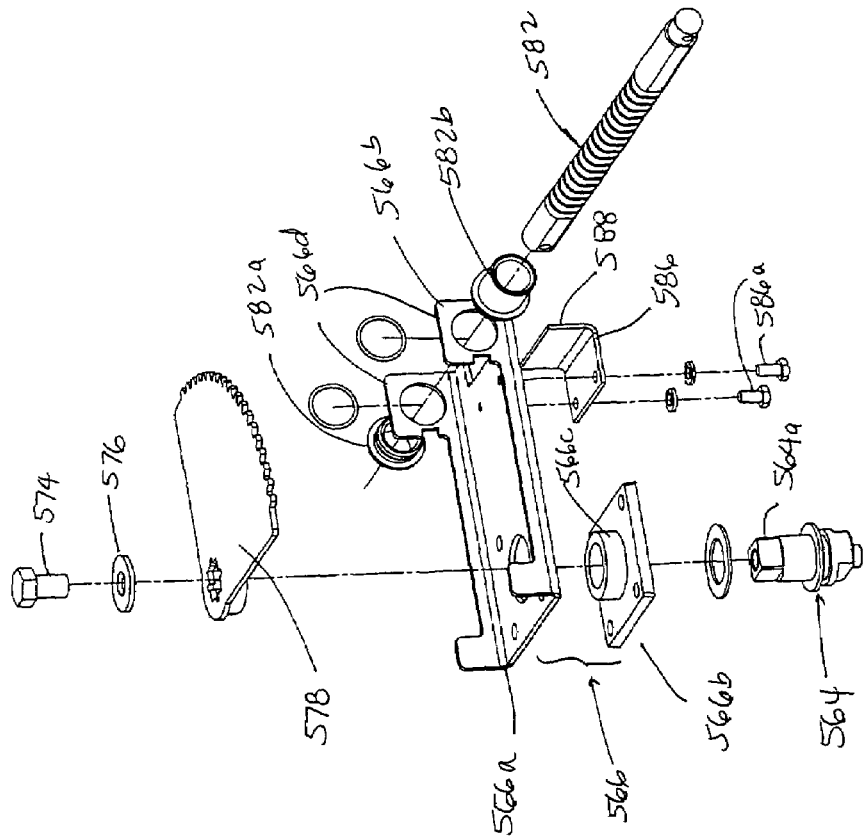
FIG. 31 is an exploded perspective view of the rack and sector actuator sub-assembly.
Figure 27:
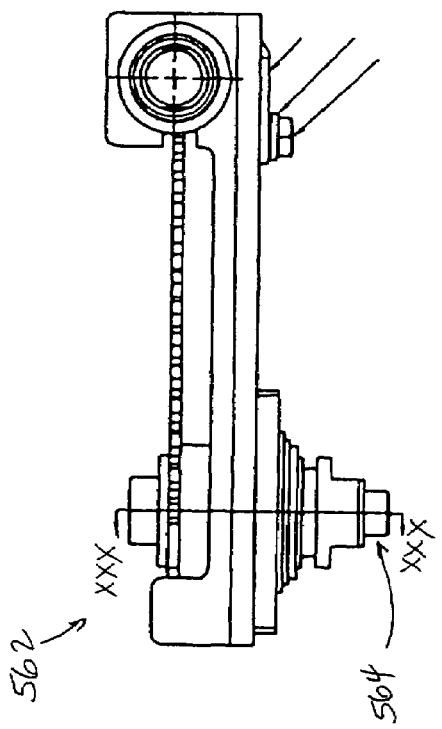
FIG. 27 is an enlarged side elevation view of a rack and sector actuator sub-assembly.

As best seen in FIGS. 17 and 18, positioned and mounted in housing 366 is a gear sector 378 and a worm gear 380. Gear sector 378 is mounted to upper end 364a of actuator 364 by a bolt 374 and washer 376. Referring to FIG. 19, sector 378 includes a non-circular opening 378a so that sector 378 is rotatably coupled to actuator 364 so that when sector 378 is rotated about axis 362a, actuator 364 will rotate to open or close the valve.

Worm gear 380 is mounted adjacent gear section 378 about a shaft 382 that is rotatably supported in housing 366 to rotatably support worm gear 380 in housing 366. Worm gear 380 engages sector 378 so that rotational movement of the shaft 382, which drives worm gear 380, will drive sector 378 and in turn actuator 364 between open and closed positions, which correspond to the gear stops that limit the rotation of the actuator, for example, to 90°. Optionally and preferably, housing 366 includes a cover 266c to enclose the actuator drive mechanism. As would be understood by those skilled in the art, an electronic motor or handle or handwheel may be coupled to shaft 382 and mounted externally and, in some cases, remotely from housing 366. In this manner, sub-assembly 362 may be used as an electric actuation sub-assembly or a handwheel actuation sub-assembly.

Referring to FIGS. 22 and 23, the numeral 460 generally designates another embodiment of a valve assembly of the present invention. Valve assembly 460 is configured as a twist-lock actuated valve assembly and includes valve body 10 and a twist-lock sub-assembly 462. Similar to the previous embodiments, twist-lock sub-assembly 462 includes an actuator 464, which is of similar construction to actuators 364, 164, and 64. Also similar to the previous embodiments, twist-lock sub-assembly 462 is adapted to mount to adapter plate 38 at mounting surface 42 of valve body 10 so that actuator 464 can be extended through adapter plate 38 to selectively rotate valve ball 14 about pivot bolt 34 and actuator 364. For further details of how actuator pivots valve ball 14, reference is made to the previous embodiments.

As best seen in FIG. 23, twist-lock sub-assembly 462 includes an adapter 466, which fastens to adapter plate 38 by a plurality of fasteners 466a. Actuator 464 extends through adapter 466 with its lower end 464e extended through adapter plate 38 for engagement with valve ball 14 and its upper end 464a extending through a stop plate 478. stop plate 478 is mounted in adapter 466 and includes a pair of tabs 480 and 480b for engagement with stops 470 and 472 provided or formed in adapter 466 in a similar manner to the first and second embodiments. In addition, similar to the previous embodiments, stop plate 478 includes a non-circular opening 478a which cooperates with a non-circular cross-section of upper portion 464a of actuator 464 to rotatably couple stop plate 478 to actuator 464. Also, mounted to upper end 464a is a lock wedge 480, a lock elevator 482, and a cover 484. Cover 484 supports a rod 486 with a knob 488 and is secured to upper end 464a of actuator 464 by a bolt 474 and washer 476. In this manner, when rod 486 is rotated about axis 460a, valve ball 14 will be moved between its open and closed position.

As best seen in FIGS. 23 and 25, the distal end of rod 486a includes an annular groove 486b for engagement by an upwardly projecting flange 482a of lock elevator 482. In this manner, when rod 486 is pushed into cover 484 with a threading action, rod 486 will push elevator 482 inwardly, which has a ramped surface that contacts the ramped surface of wedge 480 so that elevator 482 causes wedge 480 to rise or lift, which causes the actuator to lift or pull up. This upward force includes increased friction between the actuator 464 and adapter 466, which resists rotation and which locks the valve position.

Referring to FIGS. 27-31, the numeral 562 represents a rack and sector actuation sub-assembly that is suitable for use with valve body 10 described in reference to the previous embodiments. Similar to the previous embodiments, rack and sector actuation sub-assembly 562 includes an actuator 564, which is of similar construction to actuators 164, 364, and 464, and an adapter 566. Therefore, for further details of actuator 564 reference is made to the previous embodiments.

Referring to FIGS. 28 and 29, adapter 566 includes an upper adapter member 566a and a lower adapter member 566b, each with a plurality of mounting holes for receiving fasteners (not shown) for securing adapter 566 to plate 38 at mounting surface 42 of body 10. Actuator 564 extends through adapter 566 for engagement with valve ball 14 and similarly includes an enlarged mounting flange 564c and, further, a washer 565, which are captured between adapter 566 and mounting surface 42 of plate 38 of valve 10 when sub-assembly 562 is mounted to valve 10.

Lower adapter member 566b includes an upwardly extending collar 566c which extends through upper adapter member 566a, which provides a bearing surface for a gear sector 578, which is rotatably coupled to upper portion 564a and is secured thereto by a bolt 574 and washer 576. Gear sector 578 and upper portion 564a of actuator 564 have a similar non-circular interface to provide a rotational coupling between the two components. As best seen in FIGS. 28 and 29, gear sector 578 is driven by a rack 582, which is rotatably mounted in upper adapter member 566a by a pair of bushings 582a and 582b. Bushings 582a and 582b are supported in upwardly extending tabs or flanges 566d of upper adapter member 566a. Optionally and preferably, sub-assembly 562 includes an angle bracket 586, which secures to the lower adapter member 566b, which by a pair of fasteners 586a and includes an upwardly projecting flange 588, which is located and mounted adjacent the teeth of the rack (582) (FIG. 29).

Accordingly, the present invention provides a valve body that is adapted to accept several actuation sub-assemblies, which provides several advantages as noted above. This single valve body that can be used in several applications provides a great improvement over the prior art and, further, provides a basis on which further actuation assemblies can be modeled.

While several forms of the invention have been shown and described, other forms will now be apparent to those skilled in the art. For example, other types of actuator sub-assemblies may be used, such as pneumatic or hydraulic actuator sub-assemblies. Therefore, it will be understood that the embodiments shown in the drawings and described above are merely for illustrative purposes, and are not intended to limit the scope of the invention which is defined by the claims which follow as interpreted under the principles of patent law including the doctrine of equivalents.

The embodiments of the invention in which an exclusive property right or privilege is claimed are defined as follows:

1. A valve assembly comprising:
    a valve body, said valve body having an inlet, an outlet, and a chamber extending between said inlet and said outlet;
    an actuation sub-assembly having an actuator and a generally planar mounting member with a planar mounting surface and an opening, said actuator having a stem extending through said opening and said planar mounting surface of said mounting member, said actuation sub-assembly comprising an actuation sub-assembly selected from the group consisting of a manual actuation sub-assembly, a twist lock actuation sub-assembly, a gear actuation sub-assembly, an electric gear actuation sub-assembly, a handwheel gear actuation sub-assembly, a slow-close actuation sub-assembly, a pneumatic actuation sub-assembly, and a hydraulic actuation sub-assembly, and further said actuation subassembly along with said stem being removable from said valve body as a unit and being replaceable with another actuation sub-assembly along with its respective stem as a unit from the group consisting of the manual actuation sub-assembly, the twist lock actuation sub-assembly, the gear actuation sub-assembly, the electric gear actuation sub-assembly, the handwheel gear actuation sub-assembly, the slow-close actuation sub-assembly, the pneumatic actuation sub-assembly, and the hydraulic actuation sub-assembly;
    a valve ball having a ball body and a transverse passage extending through said ball body, said valve ball positioned in said chamber and being rotatable about an axis and positionable between a valve open position wherein said transverse passage provides fluid communication between said inlet and said outlet and a valve closed position wherein said ball body blocks the fluid communication between said inlet and said outlet, and said valve ball including an engagement surface for engagement by said stem; and
    wherein said valve body includes a valve body wall and a pair of mounting flanges for mounting said valve body in a fluid delivery system, said valve body wall having a planar portion and a cylindrical portion, said cylindrical portion extending between said inlet and said outlet, said planar portion of said valve body wall forming a planar mounting surface at said valve body for receiving said planar mounting surface of said mounting member and removably mounting said actuation sub-assembly to said valve body, said planar portion of said valve body wall being radially outwardly offset from said cylindrical portion of said valve body wall, and when said actuation sub-assembly is mounted to said valve body said stem being substantially coaxial with said axis and extending through said planar portion of said valve body wall for engagement with said engagement surface of said valve ball, and said valve body and said actuation sub-assembly being configured such that said actuation sub-assembly with said stem may be mounted to said valve body after said valve body is assembled and further may be removed along with said stem from said valve body without requiring disassembly of said valve body.

2. The valve assembly according to claim 1, wherein said planar mounting surface of said valve body is configured to provide a mounting surface for each actuation sub-assembly selected from the group consisting of a manual actuation sub-assembly, a twist lock actuation sub-assembly, a gear actuation sub-assembly, an electric gear actuation sub-assembly, a handwheel gear actuation sub-assembly, a slow-close actuation sub-assembly, a pneumatic actuation sub-assembly, and a hydraulic actuation sub-assembly wherein the actuation sub-assembly may be removed and replaced with each one of the group of actuation sub-assemblies.

3. The valve assembly according to claim 1, wherein said cylindrical portion has terminal edges terminating at opposed sides of said planar portion.

4. The valve assembly according to claim 3, wherein said valve body further includes a pair of valve seats, said cylindrical portion extending between said pair of valve seats, and said planar portion extending between said valve seats and spanning between said terminal edges of said cylindrical portion.

5. The valve assembly according to claim 1, wherein said actuator is supported at said actuation sub-assembly.

6. The valve assembly according to claim 5, wherein said actuation sub-assembly includes an adapter, said adapter mounting said actuation sub-assembly to said planar portion at said mounting surface.

7. The valve assembly according to claim 6, wherein said adapter includes a pair of stops for limiting the rotational motion of said actuator.

8. The valve assembly according to claim 6, wherein said stem includes an upper portion and a lower portion, said lower portion engaging said engagement surface of said valve ball, and said upper surface for engagement by one of a handle, a gear, and a gear sector.

9. The valve body according to claim 1, wherein said planar portion is offset from said cylindrical portion by a pair of opposed side walls, said side walls extending between and over said first and second mounting flanges.

10. The valve body according to claim 9, wherein said valve body wall further including offset portions, said offset portions extending and spanning between valve seats.

11. The valve body according to claim 10, wherein said offset portions comprise planar offset portions.

12. The valve assembly according to claim 1, wherein said planar portion extends between and over said flanges wherein said planar portion is supported by said flanges.

13. A valve assembly comprising:
    a valve body, said valve body having first and second valve seats and a valve body wall extending between said valve seats, said valve seats defining an inlet and an outlet, and said valve body wall defining a chamber;
    an actuation sub-assembly, said actuation sub-assembly having an actuator and a mounting plate with a planar mounting surface, said mounting plate having a transverse opening and a plurality of mounting openings, said actuator having a stem extending through said mounting plate at said transverse opening;

a valve ball having a ball body and a transverse passage extending through said ball body, said valve ball positioned in said chamber and being rotatable about an axis and positionable between a valve open position wherein said transverse passage provides fluid communication between said inlet and said outlet and a valve closed position wherein said ball body blocks the fluid communication between said inlet and said outlet, and said valve ball including an engagement surface for engagement by said stem; and wherein said valve body wall has a cylindrical portion extending between said valve seats and a planar portion extending between said valve seats, said planar portion including a planar mounting surface for mounting said actuation sub-assembly to said valve body, said planar mounting surface being radially outwardly offset from said cylindrical portion, and when said mounting plate of said actuation sub-assembly is aligned with and mounted to said planar mounting surface of said valve body by a plurality of removable fasteners extending through said mounting openings of said mounting plate and into said planar portion, when said actuation sub-assembly is mounted to said valve body said sub-assembly with said stem being mounted as a unit with said stem extending through said planar portion of said valve body wall for engagement with said engagement surface of said valve ball, and said actuation sub-assembly with said stem being removable from engagement with said valve ball as a unit when said fasteners are removed without requiring disassembly of said valve body and being replaceable with another of said actuation sub-assembly with its respective stem as a unit without requiring disassembly of said valve body.

14. The valve assembly according to claim 13, wherein said actuation sub-assembly is removable and replaceable without modification to said valve body with at least two actuation sub-assemblies selected from a group of actuation sub-assemblies consisting of a manual actuation sub-assembly, a twist lock actuation sub-assembly, a gear actuation sub-assembly an electric gear actuation sub-assembly, a handwheel gear actuation sub-assembly, a slow-close actuation sub-assembly, a pneumatic actuation sub-assembly, and a hydraulic actuation sub-assembly.

15. The valve assembly according to claim 13, wherein said valve body wall includes a pair of offset portions interconnecting said planar portion with said cylindrical portion.

16. The valve assembly according to claim 15, wherein said offset portions extend between said valve seats.

17. The valve body according to claim 15, wherein said cylindrical portion of said valve body wall forms a cylindrical-shaped portion of said valve body, said offset portions comprising planar offset portions wherein said planar portion and said offset portions form a box-shaped portion of said valve body.

18. The valve assembly according to claim 17, wherein said box-shaped portion of said valve body extends from said first seat to said second seat.

19. The valve assembly according to claim 17, wherein said stem includes an upper portion and a lower portion, said lower portion engaging said engagement surface of said valve ball, and said upper surface for engagement by one of a handle, a gear, and a gear sector.

20. The valve assembly according to claim 19, wherein said upper portion has a non-circular cross-section.

21. The valve assembly according to claim 13, wherein said cylindrical portion of said valve body includes first and second mounting flanges for mounting said valve body to respective flanges in a piping system, said planar portion extending between said flanges.

* * * * *

UNITED STATES PATENT AND TRADEMARK OFFICE
CERTIFICATE OF CORRECTION

| | | |
|---|---|---|
| PATENT NO. | : 7,516,941 B2 | Page 1 of 1 |
| APPLICATION NO. | : 11/247791 | |
| DATED | : April 14, 2009 | |
| INVENTOR(S) | : Eric N. Combs | |

It is certified that error appears in the above-identified patent and that said Letters Patent is hereby corrected as shown below:

<u>Column 6:</u>
Line 24, "slow-closed" should be --slow-close--.
Line 38, "206b" should be --206--.

<u>Column 12:</u>
Line 7, Claim 14, Insert --,-- after "sub-assembly".

Signed and Sealed this

Sixteenth Day of June, 2009

JOHN DOLL
*Acting Director of the United States Patent and Trademark Office*